(12) United States Patent
Komura et al.

(10) Patent No.: US 7,564,837 B2
(45) Date of Patent: Jul. 21, 2009

(54) RECORDING MEDIUM RECORDING A NETWORK SHUTDOWN CONTROL PROGRAM, AND NETWORK SHUTDOWN DEVICE

(75) Inventors: Masahiro Komura, Kawasaki (JP);
Kazumasa Omote, Kawasaki (JP);
Yoshiki Higashikado, Kawasaki (JP);
Masashi Mitomo, Kawasaki (JP);
Bintatsu Noda, Kawasaki (JP); Satoru Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 402 days.

(21) Appl. No.: 11/364,002

(22) Filed: Mar. 1, 2006

(65) Prior Publication Data
US 2007/0002838 A1 Jan. 4, 2007

(30) Foreign Application Priority Data
Jun. 30, 2005 (JP) ............................. 2005-192620

(51) Int. Cl.
*H04L 12/66* (2006.01)
(52) U.S. Cl. ...................................... 370/352; 370/320
(58) Field of Classification Search ........................ None
See application file for complete search history.

(56) References Cited

U.S. PATENT DOCUMENTS

2003/0159069 A1* 8/2003 Choi et al. .................. 713/201
2006/0294579 A1* 12/2006 Khuti et al. .................... 726/3

OTHER PUBLICATIONS

Patent Abstracts of Japan, Publication No. 2000-354034, Published Dec. 19, 2000.
Patent Abstracts of Japan, Publication No. 2003-348113, Published Dec. 5, 2003.
Patent Abstracts of Japan, Publication No. 2005-012606, Published Jan. 13, 2005.
Patent Abstracts of Japan, Publication No. 2005-039721, Published Feb. 10, 2005.
Patent Abstracts of Japan, Publication No. 2005-134974, Published May 26, 2005.

\* cited by examiner

*Primary Examiner*—Lester Kincaid
*Assistant Examiner*—Phuoc Doan
(74) *Attorney, Agent, or Firm*—Fujitsu Patent Center

(57) ABSTRACT

A recording medium recording a network shutdown control program permitting suitable preventive measures to be taken. A detector monitors each network segment to be managed, and on detecting a communication fulfilling a predetermined condition, the detector generates a detection notification and sends the notification to a quarantine manager. On acquiring the detection notification generated by the detector of the local device or a detection notification generated by a remote network shutdown device, the quarantine manager generates a shutdown operation request in accordance with quarantine policy stored in a quarantine policy storage, and sends the request to a communication shutdown unit. In accordance with the shutdown operation request, the communication shutdown unit sets shutdown data identifying a target of shutdown and controls packets to be input to and output from the network segment so that the packets may be shut off or passed.

18 Claims, 20 Drawing Sheets

1521 QUARANTINE POLICY

| | Item | Value |
|---|---|---|
| 1521a | Quarantine when worm is not targeting local network | Yes/No |
| 1521b | Quarantine when worm is targeting local network | Yes/No |
| 1521c | Continue quarantine when worm ceases to be detected by local device | Yes/No |
| 1521d | Waiting time for worm detection by local device | 20 sec |

FIG. 5

700 DETECTION NOTIFICATION INFO

| Time | Detection/Non-detection | Worm ID Info | Worm Detection/Quarantine Device Info | Worm Destination Address |
|---|---|---|---|---|
| 15:00:00 | Detection | TCP80 | Worm Detection/Quarantine Device 100 | Network 20 |
| 15:10:00 | Non-detection | TCP80 | Worm Detection/Quarantine Device 100 | |

1511 DETECTION/QUARANTINE STATUS MANAGEMENT TABLE

| Time | Worm ID Info | Worm Detection/Quarantine Device | Worm Attack |
|---|---|---|---|
| 15:00:00 | TCP80 | Worm Detection/Quarantine Device 100 | No |
| 15:00:00 | TCP80 | Worm Detection/Quarantine Device 200 | Yes |
| 15:00:05 | TCP80 | Worm Detection/Quarantine Device 400 | Yes |
| 15:00:10 | TCP80 | Worm Detection/Quarantine Device 300 | No |

1511a, 1511b, 1511c, 1511d

1522

| Destination Port No. | Protocol | Threshold | |
|---|---|---|---|
| | | IN Shutoff | OUT Shutoff |
| 80 | TCP | 2 | 3 |
| 25,110 | TCP | 2 | 2 |
| < 1024 | TCP | 3 | 3 |
| ≧ 1024 | TCP | 3 | 3 |

| Item | Setting | |
|---|---|---|
| | IN | OUT |
| Quarantine when worm is not targeting local network | Yes | No |
| Quarantine when worm is targeting local network | Yes | Yes |
| Continue quarantine when worm ceases to be detected by local device | Yes | No |
| Waiting time for worm detection by local device | — | 20 sec |

RECORDING MEDIUM RECORDING A NETWORK SHUTDOWN CONTROL PROGRAM, AND NETWORK SHUTDOWN DEVICE

CROSS-REFERENCE TO RELATED APPLICATIONS

This application is based upon and claims the benefits of priority from the prior Japanese Patent Application No. 2005-192620, filed on Jun. 30, 2005, the entire contents of which are incorporated herein by reference.

BACKGROUND OF THE INVENTION

1. Field of the Invention

The present invention relates to recording media recording a network shutdown control program and network shutdown devices, and more particularly, to a recording medium recording a network shutdown control program for controlling shutdown of communications of network segments under management and for quarantining, if necessary, a network segment from the network, and a network shutdown device for performing such control operations.

2. Description of the Related Art

With the recent expansion of networks due to the diffusion of the Internet, for example, an increasing number of computer viruses have been spreading via networks, causing extensive damage.

Among such computer viruses, a type called worm, in particular, moves from computer to computer and successively infects computers connected by a network while self-replicating. A worm self-replicates and spreads at extremely high speed and causes a great deal of traffic in the process of spreading. Consequently, heavy loads are imposed on networks, sometimes making the networks paralyzed. Also, a worm infects computers one after another, and accordingly, once a worm spreads, it is not possible to avoid damage by just finding the computers infected with the worm and removing the worm. It is therefore essential to monitor traffic at the border of a network to detect incoming worms and prevent the invasion of such worms.

In a conventional worm discrimination device, packets transmitted over a communication path connecting internal and external networks are monitored to acquire, for example, information on the amount of packets and destination addresses, the acquired information is analyzed by using preset criteria to determine whether a worm is contained or not, and if a worm is detected, communication with the network with respect to which the worm attack has been detected is shut off to prevent infection (e.g., Unexamined Japanese Patent Publication No. 2005-134974 (cf. paragraph nos. [0045] through [0099], FIG. 2)).

A network shutdown system has also been proposed wherein, on detection of an attacking computer making an attack such as a worm attack or an attacking network to which the attacking computer is connected, communication between the network under management and the attacking network or computer is shut off even if the managed network is actually not under attack (e.g., Unexamined Japanese Patent Publication No. 2005-12606 (cf. paragraph nos. [0019] to [0022], FIG. 1)).

In the conventional network shutdown system, however, when an attack is detected, only the communication with a network segment with respect to which the attack has been detected is shut off. Accordingly, the conventional system is unable to effectively prevent attacks, such as worm attacks, which cause widespread damage in a manner such that an infected computer repeats an attack while randomly changing addresses and that a secondarily infected computer also acts as an attacking computer.

The objective of the conventional technique disclosed in the aforementioned Unexamined Japanese Patent Publication No. 2005-134974 (paragraph nos. [0045] through [0099], FIG. 2) is to protect the internal networks against attacks from external networks. When an attack from an external network is detected, those networks which have not yet detected the attack are also notified of the attack so that the networks may be shut down in advance and thus protected from the attack. On the other hand, when an attack from an internal network to an external network is detected, only the communication with the network with respect to which the attack has been detected is shut off. Accordingly, in cases where an attacking computer as well as secondarily infected computers continue attacking, like worm attacks, worm infection cannot be prevented with the conventional technique.

Further, the conventional shutdown notification simply demands execution of shutdown, and upon receiving the notification, the network shutdown device unconditionally executes shutdown. Thus, in cases where the shutdown notification is generated as a result of erroneous detection even though there is no attack in actuality, a problem arises in that it is impossible to prevent the shutdown of networks which are not under attack.

SUMMARY OF THE INVENTION

The present invention was created in view of the above circumstances, and an object thereof is to provide a recording medium recording a network shutdown control program and a network shutdown device whereby a suitable preventive measure can be taken prior to actual attacking, thereby preventing the spread of infection.

To achieve the object, there is provided a computer-readable recording medium recording a network shutdown control program for causing a computer to control shutdown of communication of a network segment to be managed and, if necessary, to perform a quarantine process for quarantining the network segment from a network. The network shutdown control program causes the computer to function as a detector, a quarantine manager, and a communication shutdown unit. The detector monitors the communication of the managed network segment to determine whether the communication fulfills a predetermined condition or not, and generates predetermined detection notification information if it is judged that the communication fulfills the predetermined condition. The quarantine manager is operative in response to acquisition of the detection notification information from the detector or acquisition of detection notification information supplied from a network shutdown device for managing an external network segment and notifying that communication of the external network segment fulfills the predetermined condition, to generate a shutdown operation request relating to shutdown of incoming/outgoing communication of the managed network segment, based on the acquired detection notification information and in accordance with a quarantine policy stored in a quarantine policy storage, and to transmit the detection notification information acquired from the detector to the network shutdown device for managing the external network segment. The communication shutdown unit acquires the shutdown operation request from the quarantine manager and, in accordance with the shutdown operation request, controls shutdown of that communication of the managed network segment which fulfills the predetermined condition.

Also, to achieve the above object, there is provided a network shutdown device for controlling shutdown of communication of a network segment to be managed and, if necessary, performing a quarantine process for quarantining the network segment from a network. The network shutdown device comprises a detector, a quarantine manager, and a communication shutdown unit. The detector monitors the communication of the managed network segment to determine whether the communication fulfills a predetermined condition or not, and generates predetermined detection notification information if it is judged that the communication fulfills the predetermined condition. The quarantine manager is operative in response to acquisition of the detection notification information from the detector or acquisition of detection notification information supplied from a network shutdown device for managing an external network segment and notifying that communication of the external network segment fulfills the predetermined condition, to generate a shutdown operation request relating to shutdown of incoming/outgoing communication of the managed network segment, based on the acquired detection notification information and in accordance with a quarantine policy stored in a quarantine policy storage, and to transmit the detection notification information acquired from the detector to the network shutdown device for managing the external network segment. The communication shutdown unit acquires the shutdown operation request from the quarantine manager and, in accordance with the shutdown operation request, controls shutdown of that communication of the managed network segment which fulfills the predetermined condition.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 exemplifies a quarantine policy to be applied in response to a detection notification according to the embodiment.

FIG. 12 exemplifies detection notification information according to the embodiment.

FIG. 14 exemplifies a detection/quarantine status management table according to the embodiment.

FIG. 15 illustrates an exemplary quarantine policy setting conditions for starting the quarantine process according to the embodiment.

FIG. 20 exemplifies a quarantine policy set in the worm detection/quarantine devices of the embodiment.

DESCRIPTION OF THE PREFERRED EMBODIMENTS

Preferred embodiments of the present invention will be described below with reference to the accompanying drawings. In the following, first, the concept of the invention will be described, and then specific embodiments will be explained in detail.

Figure 1:
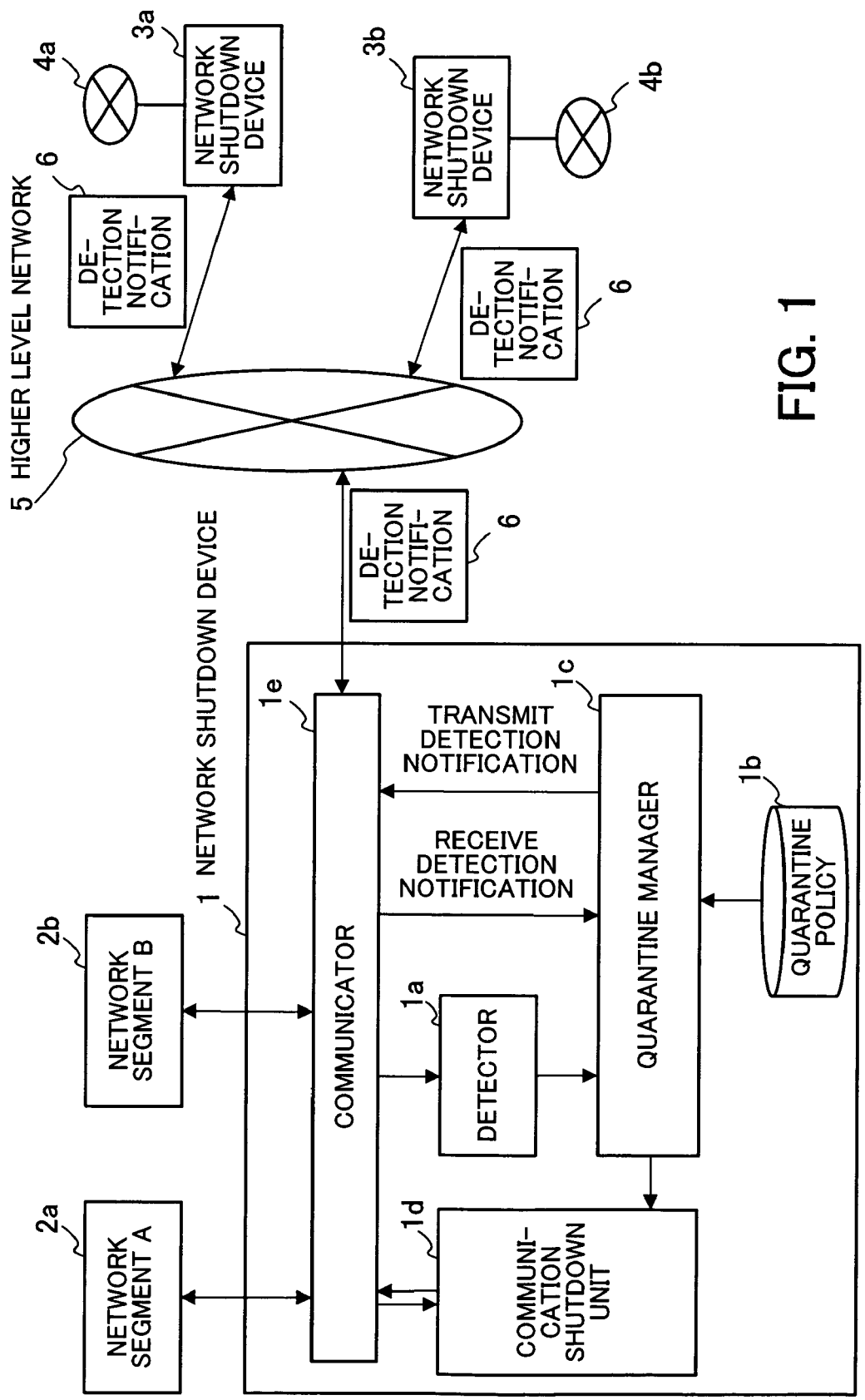
FIG. 1 is a conceptual diagram illustrating the invention applied to embodiments.

FIG. 1 is a conceptual diagram illustrating the invention applied to the embodiments.

A network shutdown device 1 according to the present invention is interposed between network segments A (2a) and B (2b), which are the targets of management, and a higher level network 5 and monitors packets output from the network segments A (2a) and B (2b) to the higher level network 5 as well as those input to the network segments from the higher level network 5. Network shutdown devices 3a and 3b, which are identical with the network shutdown device 1, are adapted to manage network segments 4a and 4b, respectively. In the following, a network segment which is not the target of management will be referred to as external network segment.

The network shutdown device 1 comprises a detector 1a, a quarantine policy (storage) 1b, a quarantine manager 1c, a communication shutdown unit 1d, and a communicator 1e.

The detector 1a monitors packets input to and output from the network segments A (2a) and B (2b) to be managed. On detecting communication fulfilling a predetermined condition, the detector sends a detection notification indicative of the detected communication to the quarantine manager 1c. For example, a terminal infected with a worm shows a characteristic such that it transmits an enormous number of packets of the same protocol to random destination addresses. Accordingly, the predetermined condition is set to detect such a characteristic (to determine whether or not packets of the same protocol exceeding a prescribed number have been transmitted to different addresses within a predetermined period), thereby determining whether the communication is originated by a worm or not. Methods for detecting worms and various other forms of communication are known in the art, and in the following, it is assumed that a suitable detection method matching the targets of detection has been selected.

The quarantine policy (storage) 1b stores therein a preset quarantine policy defining a quarantine process for quarantining the network segments A (2a) and B (2b) to be managed. The quarantine policy prescribes the quarantine process to be executed with respect to the network segments A (2a) and B (2b) in accordance with the status indicated by the detection notification. For example, the policy that "quarantine should be executed if a detection notification is received from a remote device and also if the network segment under management is being attacked" is set as the quarantine policy.

On acquiring a detection notification indicative of the detection of communication fulfilling the predetermined condition from the detector 1a or from the remote network shutdown device 3a or 3b, the quarantine manager 1c reads out the quarantine policy stored in the quarantine policy (storage) 1b, then checks the acquired detection notification against the read quarantine policy to determine whether to shut down the two-way communication, incoming communication or outgoing communication, or to cancel the shutdown, and decides a quarantine status for the network segments A (2a) and B (2b). Also, the quarantine manager 1c generates a shutdown operation request based on the quarantine status and sends the request to the communication shutdown unit 1d. Further, the quarantine manager 1c creates a management information entry relating to shutdown data, such as data indicating the target of shutdown, and registers the entry in a management information table. The shutdown data is set so as to specify, for example, packets falling under a certain category or packets with a certain destination port number. Also, the shutdown data can be set separately for the communication from the network segments under management to the outside (hereinafter OUT-communication) and the communication from the outside to the managed network segments (hereinafter IN-communication). Further, if the detection notification has been acquired from the detector 1a, the quarantine manager 1c transmits the detection notification to the other network shutdown devices 3a and 3b via the higher level network 5.

In cases where the detection notification has been acquired from the detector 1a, a shutdown request may be unconditionally generated, without regard to the quarantine policy, because the detected state has direct connection with the network segment A (2a) or B (2b) under management. On the other hand, where the detection notification has been acquired from the remote network shutdown device 3a or 3a, the quarantine policy may be looked up to decide the quarantine status.

The management information entry once registered in the management information table is deleted when the corresponding communication has ceased to be detected, namely, when the detection notification indicative of the communication fulfilling the predetermined condition is no longer acquired from the detector 1a or the network shutdown device 3a or 3b. Subsequently, a shutdown cancel request is sent to the communication shutdown unit 1d. Further, if the management information entry has been registered based on the detection notification from the detector 1a, a non-detection notification is transmitted to the other network shutdown devices 3a and 3b via the higher level network 5.

In accordance with a shutdown request or shutdown cancel request from the quarantine manager 1c, the communication shutdown unit 1d controls shutdown of the network segments A (2a) and B (2b) under management. The communication shutdown unit 1d holds a shutdown data table for registering the shutdown data. When a shutdown request is generated, the shutdown unit 1d registers shutdown data in the shutdown data table in accordance with the request, and when a shutdown cancel request is generated, the shutdown unit 1d deletes the corresponding shutdown data from the shutdown data table. Also, the shutdown unit id monitors the packets relayed via the communicator 1e and discards those packets which match the shutdown data registered in the shutdown data table, thereby preventing passage of the packets, that is, shutting off the communication. The packets disagreeing with the shutdown data are allowed to pass. This communication shutdown control is executed with respect to each of the IN- and OUT-communications. If shutdown of the IN-communication has been specified, for example, only the incoming communication is monitored to carry out the communication shutdown control.

The communicator 1e controls transmission/reception of packets exchanged between devices of the network segments A (2a) and B (2b) and the network shutdown device 3a connected via the higher level network 5 and devices of the network segment 4a managed by the network shutdown device 3a, as well as the network shutdown device 3b similarly connected via the higher level network 5 and devices of the network segment 4b managed by the network shutdown device 3b.

In the network shutdown device 1 configured as described above, packets to be input to and output from the network segments A (2a) and B (2b) are once input to the communicator 1e to be relayed thereby.

The detector 1a checks the packets to see if there is a communication fulfilling the predetermined condition. On detecting a communication fulfilling the predetermined condition, the detector generates a detection notification indicative of the detected communication and sends the notification to the quarantine manager 1c. When the detection notification is received from the detector 1a or when a detection notification generated by the remote network shutdown device 3a or 3b is received via the communicator 1e, the quarantine manager 1c determines, based on the detection notification, whether a quarantine condition defined by the quarantine policy stored in the quarantine policy (storage) 1b is fulfilled or not. If the quarantine condition is fulfilled and also if the communication is not being shut off, management information including the shutdown data is registered in the management information table, and a shutdown request is sent to the communication shutdown unit 1d. Also, if, after a communication fulfilling the predetermined condition is registered in the management information table as management information, the detection notification ceases to be received, the corresponding management information is deleted from the management information table and a shutdown cancel request is sent to the communication shutdown unit 1d. On receiving the shutdown request or the shutdown cancel request, the communication shutdown unit 1d updates the shutdown data table storing the shutdown data, and performs shutdown control based on the shutdown data table.

In this manner, if a communication fulfilling the predetermined condition is detected among the communications involving the network segments A (2a) and B (2b) under management, the communication is shut off and a detection notification 6 is transmitted to the other network shutdown devices 3a and 3b. Shutdown can be executed by setting the shutdown data separately for the IN-communication and the OUT-communication. Accordingly, in the case where an attacker is found inside the local area, for example, the OUT-communication alone may be shut off, thus permitting the shutdown to be executed in accordance with the situation. Also, communication is shut off in response to the detection notification 6 transmitted from other network shutdown devices, and it is therefore possible to take preventive measures against attacks not detected yet.

Let it be assumed, for example, that the detector 1a of the network shutdown device 1 discovers that a device connected to the managed network segment A (2a) is infected with a worm. In this case, the network shutdown device 1 shuts off the communication and transmits the detection notification 6 to the network shutdown devices 3a and 3b. The worm is not detected yet by the network shutdown devices 3a and 3b, but in response to the detection notification 6 from the network shutdown device 1, the devices 3a and 3b shut off their IN-communication, thereby preventing infection of the local networks.

An embodiment of the present invention will be now described in detail with reference to the drawings, wherein the invention is applied, by way of example, to a worm detection/quarantine device connected between a network segment and a higher level network to detect worms and to shut down the network segment in case a worm is detected.

Figure 2:
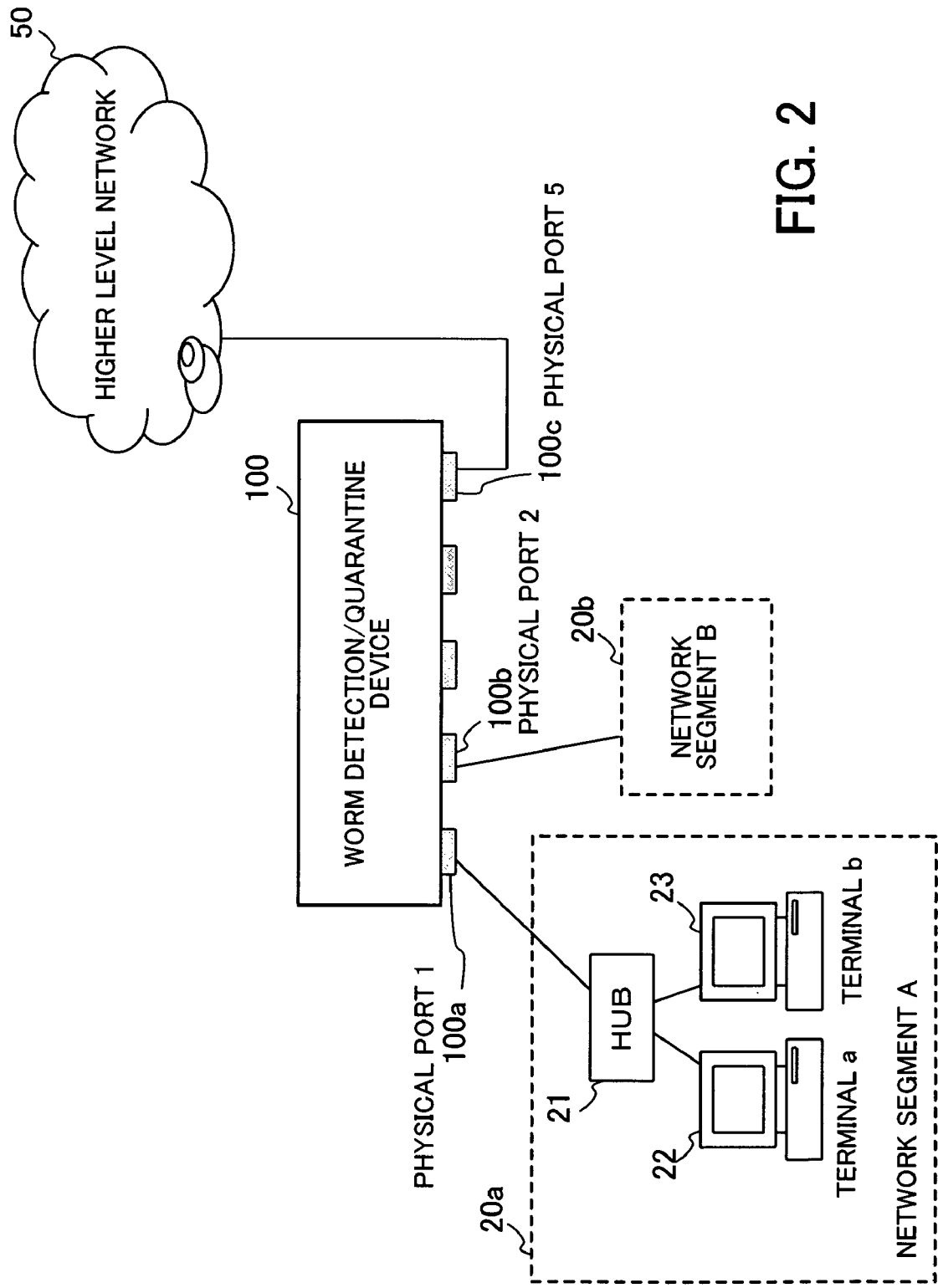
FIG. 2 shows the configuration of a system to which a worm detection/quarantine device according to an embodiment is applied.

FIG. 2 shows the configuration of a system to which the worm detection/quarantine device of the embodiment is applied.

The worm detection/quarantine device 100 of the embodiment is connected through a plurality of physical ports to a higher level network 50 as well as to network segments A (20a) and B (20b) to be managed. In the illustrated example, the network segment A (20a) is connected to a physical port 1 (100a), the network segment B (20b) to a physical port 2 (100b), and the higher level network 50 to a physical port 5 (100c). The higher level network 50 is also connected with a plurality of other worm detection/quarantine devices and their network segments to be managed thereby. The network segment A (20a) includes terminals a (22) and b (23) connected via a hub 21, and the network segment B (20b) has a similar configuration.

The worm detection/quarantine device 100 is input via the individual physical ports with packets communicated in both directions, that is, the IN- and OUT-communication packets, checks the packets for worm detection and communication shutdown, and forwards the packets to their destinations if the packets are not the target of shutdown. The IN-communication denotes communication from the higher level network 50 to the network segment A (20a) or B (20b) under management. The OUT-communication denotes communication from the network segment A (20a) or B (20b) under management to the higher level network 50.

Figure 3:
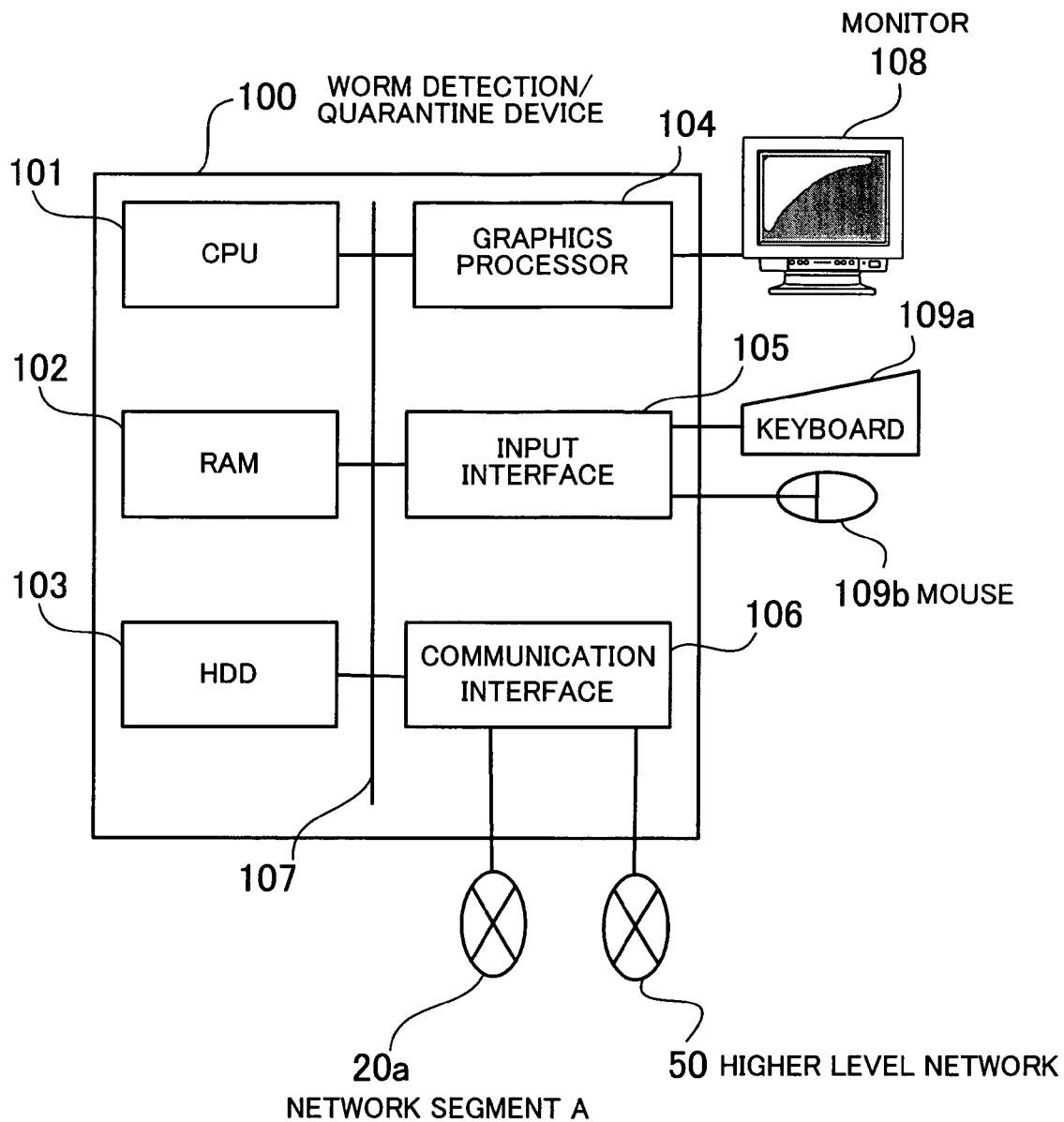
FIG. 3 is a block diagram showing an exemplary hardware configuration of the worm detection/quarantine device of the embodiment.

The hardware configuration of the worm detection/quarantine device 100 will be now described. FIG. 3 is a block diagram showing an exemplary hardware configuration of the worm detection/quarantine device of the embodiment.

The worm detection/quarantine device 100 is in its entirety under the control of a CPU (Central Processing Unit) 101. To the CPU 101 are connected, via a bus 107, a RAM (Random Access Memory) 102, an HDD (Hard Disk Drive) 103, a graphics processor 104, an input interface 105, and a communication interface 106.

The RAM 102 temporarily stores OS (Operating System) programs and at least part of application programs executed by the CPU 101. Also, the RAM 102 stores various other data necessary for the processing by the CPU 101. The HDD 103 stores the OS and application programs. The graphics processor 104 is connected with a monitor 108. In accordance with instructions from the CPU 101, the graphics processor displays images on the screen of the monitor 108. The input interface 105 is connected with a keyboard 109a and a mouse 109b, and sends signals from the keyboard 109a and the mouse 109b to the CPU 101 via the bus 107. The communication interface 106 is connected through physical ports to the higher level network 50 and the network segment A (20a).

The processing function of the embodiment can be implemented by the hardware configuration described above. Although FIG. 3 shows the hardware configuration of the worm detection/quarantine device, the terminal devices also have a similar hardware configuration.

The following describes how the worm detection/quarantine device of the embodiment is programmed.

Figure 4:
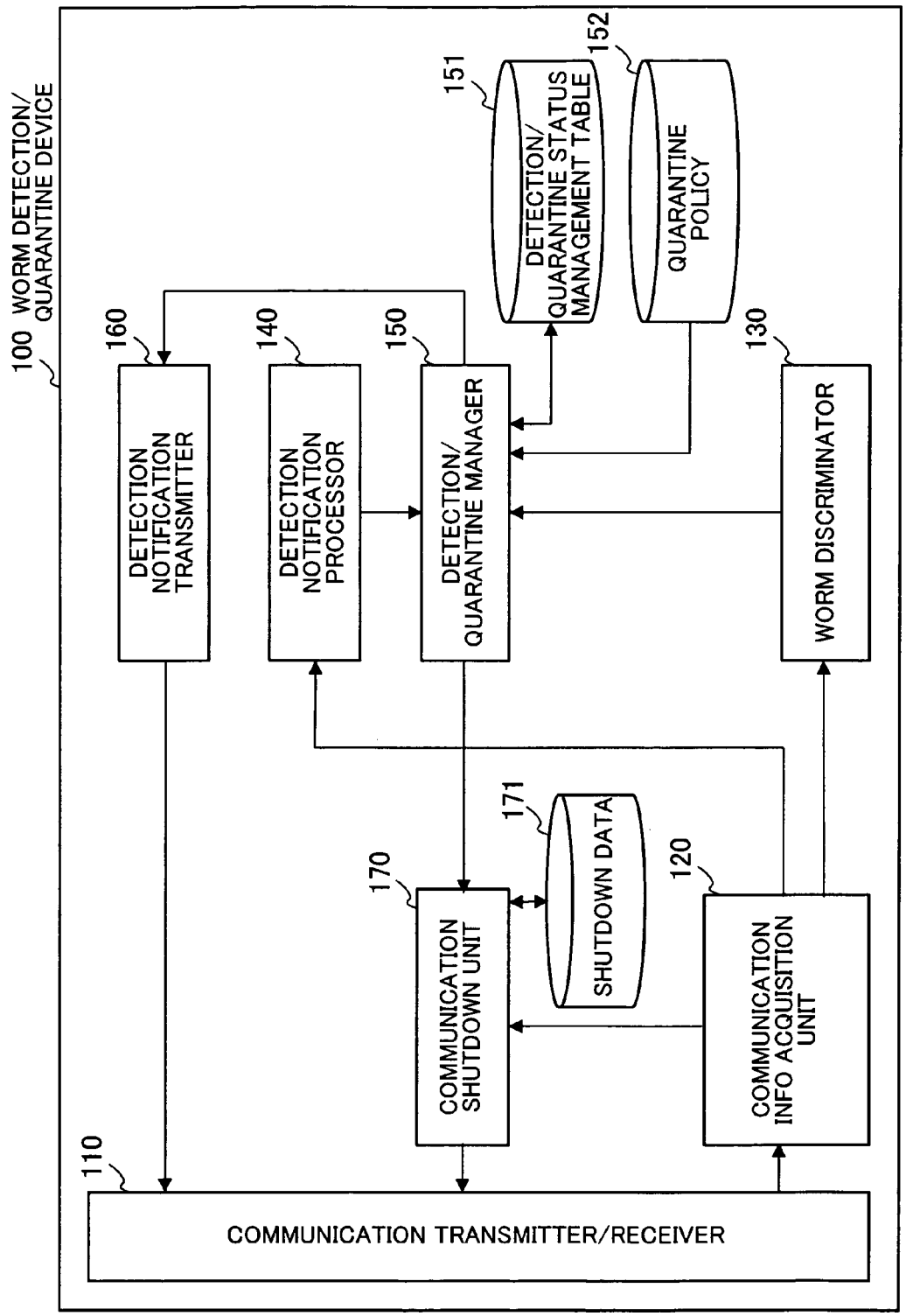
FIG. 4 is a functional block diagram of the worm detection/quarantine device of the embodiment.

FIG. 4 is a functional block diagram of the worm detection/quarantine device according to the embodiment.

The worm detection/quarantine device 100 of the embodiment comprises a communication transmitter/receiver 110, a communication information (INFO) acquisition unit 120, a worm discriminator 130, a detection notification processor 140, a detection/quarantine manager 150, a detection notification transmitter 160 and a communication shutdown unit 170 for performing respective processes. Also, the worm detection/quarantine device has storage devices for storing a detection/quarantine status management table 151, a quarantine policy 152, and shutdown data 171.

The communication transmitter/receiver 110 takes care of the transmission/reception of packets communicated between terminals connected to the network segments under management and devices connected via the higher level network. The transmitter/receiver transfers each received packet to the communication information acquisition unit 120, and transmits the packet, of which the passage has been permitted by the communication shutdown unit 170, to a corresponding destination. Also, the transmitter/receiver transmits the detection notification requested from the detection notification transmitter 160 to specified destinations.

The communication information acquisition unit 120 temporarily holds the packet received from the communication transmitter/receiver 110 and acquires a part or whole of the received packet, the acquired information being transferred to the worm discriminator 130 as communication information. At this time, the acquisition unit checks the acquired packet to determine whether or not the packet is a detection notification from a remote worm detection/quarantine device. If the packet is a detection notification, the acquisition unit transfers the packet to the detection notification processor 140. The packet is also transferred to the communication shutdown unit 170.

The worm discriminator 130 checks the communication information transferred thereto to determine the possibility of the packet being infected with a worm, and notifies the detection/quarantine manager 150 of the determination result. To discriminate worms, the worm detection method disclosed in Unexamined Japanese Patent Publication No. 2005-134974 (paragraph nos. [0045] through [0099], FIG. 2) may be used, for example.

The detection notification processor 140 sends the detection notification from a remote worm detection/quarantine device, which has been acquired by the communication information acquisition unit 120, to the detection/quarantine manager 150.

To the detection/quarantine manager 150 are connected the detection/quarantine status management table (storage device) 151 for storing a detection/quarantine status management table which corresponds to the management information table and in which is registered management information about shutdown data describing the features (protocols, destination port numbers, worm types, etc.) of targets of shutdown, and the quarantine policy (storage device) 152 for storing a quarantine policy. Based on the detection notification input from the worm discriminator 130 or from the detection notification processor 140, the detection/quarantine manager 150 looks up the data in the detection/quarantine status management table (storage device) 151 and the quarantine policy (storage device) 152, to determine whether to shut off the communication and whether to cancel the shutdown of the communication. In accordance with the determination result, the detection/quarantine manager 150 updates the detection/quarantine status management table and generates a shutdown request or a shutdown cancel request, which is then transferred to the communication shutdown unit 170.

The processing function of the detection/quarantine manager 150 will be now described in detail with reference to the case where a worm has been detected by the worm discriminator 130 and the case where a detection notification has been received from a remote device.

Where a detection notification has been received from the worm discriminator 130, that is, where a worm is detected by the local device, the detection/quarantine manager 150 looks up the detection/quarantine status management table. If a detection notification indicating the detection of a worm is received from the worm discriminator 130 while the worm is not detected yet, the detection/quarantine manager 150 adds an entry to the detection/quarantine status management table and sends a shutdown request to the communication shutdown unit 170. Then, the detection/quarantine manager 150 requests the detection notification transmitter 160 to transmit a detection notification indicative of the worm detection. If a detection notification indicative of the detection of a worm is received from the worm discriminator 130 after the worm is detected, no special process is performed since the shutdown request has already been generated. Also, with respect to an entry registered in the detection/quarantine status management table, if a detection notification indicative of the worm detection is not received from the worm discriminator 130 over a predetermined period, the detection/quarantine manager 150 judges that the worm is no longer detected, deletes the corresponding entry from the detection/quarantine status management table, and sends a shutdown cancel request to the communication shutdown unit 170. Then, the detection/quarantine manager 150 requests the detection notification transmitter 160 to transmit, to the other worm detection/quarantine devices, a non-detection notification indicating that the worm has ceased to be detected. Alternatively, whether the worm has ceased to be detected or not may be determined by the worm discriminator 130 so that the detection/quarantine manager 150 may make a shutdown cancel request on receiving a non-detection notification from the worm discriminator 130.

The following explains the case where the detection notification has been received from the detection notification processor 140, that is, a worm has been detected by a remote device, and the case where the worm thereafter ceases to be detected. On receiving the detection notification from the detection notification processor 140, the detection/quarantine manager 150 looks up the detection/quarantine status management table. If the worm is not detected yet, the detection/quarantine manager 150 reads out the quarantine policy from the quarantine policy (storage device) 152 and determines whether to effect quarantine according to the quarantine policy. If it is judged that quarantine should be effected, the detection/quarantine manager 150 adds an entry to the detection/quarantine status management table and makes a shutdown request to the communication shutdown unit 170. If the communication is already shut off when the detection notification is received, no special process is performed. On the other hand, when a non-detection notification is received from the detection notification processor 140, the detection/quarantine manager 150 looks up the detection/quarantine status management table and, if the table shows that the worm has been detected, determines whether to cancel the quarantine according to the quarantine policy. If it is judged that the quarantine should be canceled, the detection/quarantine manager 150 deletes the corresponding entry from the detection/quarantine status management table and makes a shutdown cancel request to the communication shutdown unit 170.

On receiving the request from the detection/quarantine manager 150, the detection notification transmitter 160 requests the communication transmitter/receiver 110 to transmit, to the other worm detection/quarantine devices, a detection notification about the worm which has been detected by the local device or which has ceased to be detected.

To the communication shutdown unit 170 is connected the shutdown data (storage device) 171 for storing a shutdown data table in which is registered shutdown data set in accordance with instructions from the detection/quarantine manager 150. On receiving a shutdown request or a shutdown cancel request from the detection/quarantine manager 150, the shutdown unit 170 updates the shutdown data. Also, the shutdown unit 170 determines whether or not the packet transferred from the communication information acquisition unit 120 matches the shutdown data. If the packet matches the shutdown data, the shutdown unit 170 discards the packet; if not, the shutdown unit 170 requests the communication transmitter/receiver 110 to transmit the packet to its destination.

In FIG. 4, the worm detection/quarantine device 100 is illustrated as a single device, but it may be constituted by two devices, namely, a firewall or network switching device serving as the communication transmitter/receiver 110, the communication information acquisition unit 120 and the communication shutdown unit 170, and a worm detection/quarantine management server serving as the worm discriminator 130, the detection notification processor 140, the detection/quarantine manager 150 and the detection notification transmitter 160.

The following describes a worm detection/quarantine process performed by the worm detection/quarantine device 100 configured as described above. In the following description of the process, when the worm discriminator 130 detects a communication originated by a worm within the network segments under management, quarantine/shutdown is executed regardless of the quarantine policy. This is because, where a worm-originated communication is actually detected within the managed network segments, measures should desirably be taken as quickly as possible. In cases where a detection notification is received from a remote device, quarantine/shutdown is executed according to the quarantine policy. This is because, where a worm-originated communication is not yet detected within the managed network segments, preventive measures should desirably be taken according to the policy of the network administrator or the like who is knowledgeable about the entire system, without unconditionally executing quarantine/shutdown. Needless to say, the quarantine policy may be set so as to effect quarantine when a worm is detected by the local device.

The quarantine policy prescribing quarantine conditions will be now explained.

FIG. 5 shows an exemplary quarantine policy to be applied in response to a detection notification according to the embodiment.

The quarantine policy 1521 prescribes quarantine conditions for quarantining the network segments under management from the network when a worm detection notification is received from a remote device. In the following, the network segment managed by the local device is referred to as local network, and the network segment managed by a remote device is referred to as remote network.

In the illustrated example, four items, that is, "Quarantine when worm is not targeting local network" 1521a, "Quarantine when worm is targeting local network" 1521b, "Continue quarantine when worm ceases to be detected by local device"

1521*c* and "Waiting time for worm detection by local device" 1521*d*, are set as the quarantine conditions for the local network. The detection notification includes data specifying the detected worm or the worm which has ceased to be detected, and where a worm has been detected, the detection notification additionally includes data specifying the destination address (hereinafter referred to as worm destination address) of the packet which is suspected to have been originated by the worm, as described later.

The item "Quarantine when worm is not targeting local network" 1521*a* specifies whether to effect quarantine when the local network is not included as the worm destination address, namely, when a worm has been detected but a packet suspected to have been originated by the worm is not received by the local network. Accordingly, if "Yes" is set for this item, a shutdown request is generated on receipt of a detection notification, even though the local network has not yet received a packet which is suspected to have been originated by a worm.

The item "Quarantine when worm is targeting local network" 1521*b* specifies whether to effect quarantine when the local network is included as the worm destination address, that is, when a packet suspected to have been originated by a worm is received by the local network. Thus, where "Yes" is set for the item, a shutdown request is generated when a worm has been detected by a remote network and also the local network is included as the worm destination address.

The item "Continue quarantine when worm ceases to be detected by local device" 1521*c* specifies whether to cancel quarantine when the worm has ceased to be detected by the local device over a predetermined waiting time after the quarantine is effected according to the item 1521*a* or 1521*b*. Accordingly, where "Yes" is set for this item, the shutdown request generated on detection of a worm remains valid according to the item 1521*a* or 1521*b* even after the worm is no longer detected within the local network. On the other hand, where "No" is set for the item, a shutdown cancel request is generated when the worm has ceased to be detected by the local device.

The item "Waiting time for worm detection by local device" 1521*d* specifies the predetermined waiting time used in making a decision according to the item 1521*c*. Where "20 seconds" is set, for example, a shutdown cancel request is generated if the worm is not detected by the local device over a period of 20 seconds after the shutdown request was made.

Packets processed in this embodiment will be now described. According to the embodiment, the worm discrimination and the quarantine process are performed using TCP (Transmission Control Protocol) packets, UDP (User Datagram Protocol) packets, ICMP (Internet Control Message Protocol) packets, etc. Taking a TCP packet as an example, the packet structure will be explained.

Figure 6:
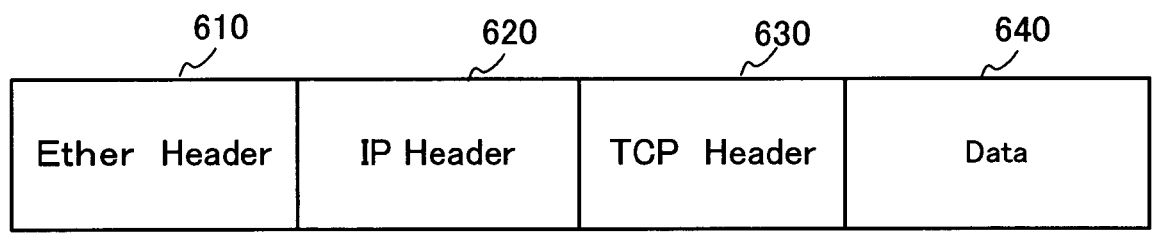
FIG. 6 shows the structure of a TCP packet.

FIG. 6 shows the structure of a TCP packet.

A TCP packet has headers added by individual layer processes, and a packet processed by the worm detection/quarantine device 100 of the embodiment has a data section 640 affixed with a TCP header 630, an IP header 620, and an Ether header 610. In the case of a UDP packet, the TCP header 630 is replaced by a UDP header, and in the case of an ICMP packet, the TCP header 630 is replaced by a type field, codes, etc. corresponding to an ICMP header. For the other parts, these packets are identical, and therefore, detailed description thereof is omitted.

Figure 7A:
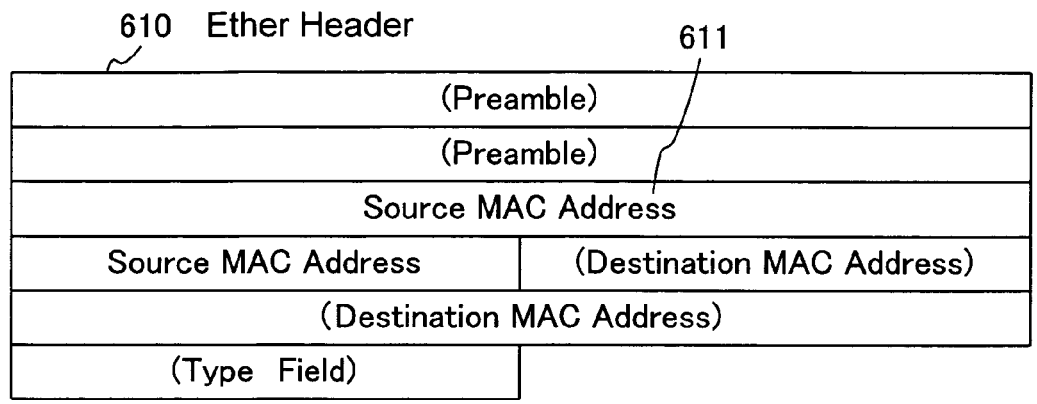
FIGS. 7A to 7C show detailed structures of individual headers of a TCP packet.
Figure 7B:
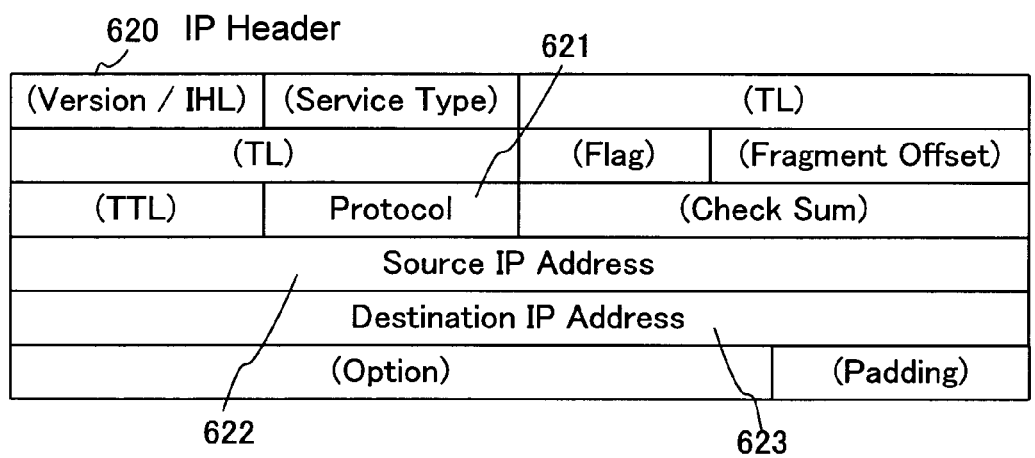
Figure 7C:
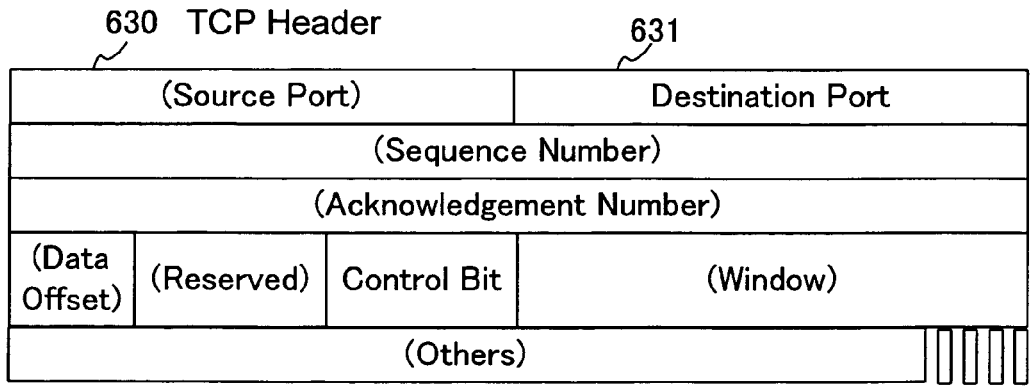

FIGS. 7A to 7C show detailed structures of the individual headers of a TCP packet. In the figures, the sections in parentheses have no connection with the embodiment, and therefore, description of such sections is omitted.

In FIG. 7A, the Ether header 610 includes a source MAC address 611. By looking up the source MAC address, it is possible to identify the MAC address of the source of the packet.

In FIG. 7B, the IP header 620 includes a protocol 621, a source IP address 622 and a destination IP address 623, whereby the protocol type, source IP address and destination IP address of the packet can be identified.

With regard to the Ether header 610 and the IP header 620, UDP and ICMP packets have the same arrangements.

In FIG. 7C, the TCP header 630 includes a destination port number 631, and by looking up the port number, it is possible to identify the destination port number of the packet. A UDP packet similarly includes a destination port number.

The worm detection/quarantine process will be now described. In the following, first, the flow of the overall process will be described, and then processes performed by the individual processors will be explained.

Figure 8:
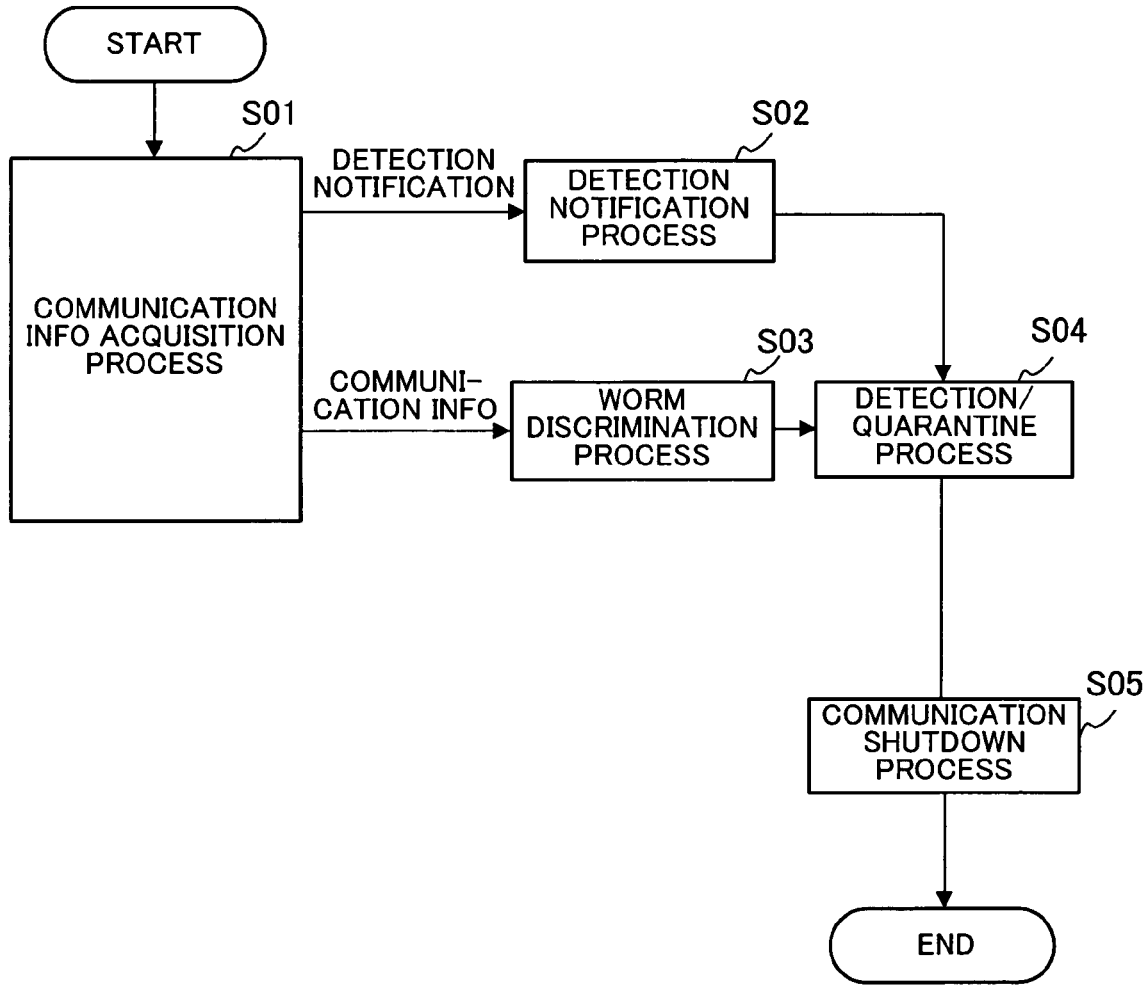
FIG. 8 is a flowchart illustrating a worm detection/quarantine process according to the embodiment.

FIG. 8 is a flowchart illustrating the worm detection/quarantine process according to the embodiment.

The worm detection/quarantine device 100 relays all of the OUT-communication packets from the network segments under management to the outside and the IN-communication packets from the outside to the managed network segments, and monitors the relayed packets to determine whether or not there is a communication originated by a worm.

The process is started when a packet to be relayed is received via the communication transmitter/receiver 110.

STEP S01: The communication information acquisition unit 120 determines whether or not the packet input via the communication transmitter/receiver 110 is a detection notification transmitted from a remote worm detection/quarantine device. If the input packet is a detection notification, the detection notification is sent to the detection notification processor 140 and the process proceeds to a detection notification process of Step S02. If the input packet is not a detection notification, on the other hand, the communication information is transferred to the worm discriminator 130 and the process proceeds to a worm discrimination process of Step S03.

STEP S02: The detection notification processor 140 passes the acquired detection notification on to the detection/quarantine manager 150, and the process proceeds to Step S04.

STEP S03: The worm discriminator 130 checks the acquired communication information for worms and generates a detection notification. If a worm is detected, the detection notification is sent to the detection/quarantine manager 150 and the process proceeds to a detection/quarantine process of Step S04.

STEP S04: On acquiring the detection notification generated in the worm discrimination process (Step S03) or transmitted from a remote network, the detection/quarantine manager 150 determines, based on the detection notification, whether a shutdown request or a shutdown cancel request needs to be generated. At this time, the detection/quarantine manager outputs an instruction to transmit the detection notification to the other worm detection/quarantine devices, if necessary.

STEP S05: If, with respect to the communications involving the local network, a shutdown request or a shutdown cancel request has been generated in the detection/quarantine process (Step S04), the communication shutdown unit 170 makes settings for the shutdown or cancellation of the shutdown in accordance with the request, and modifies the shutdown data. Also, in accordance with the settings, the shutdown unit 170 performs communication control so that the packet input from the communication transmitter/receiver 110 may be returned to the transmitter/receiver 110 to continue communication or may be discarded to shut off the communication. The shutdown unit 170 uses the communication information input from the communication information acquisition unit 120, and this procedure is not touched upon here for brevity's sake and will be explained in detail later.

The aforementioned processes are executed, and in cases where a worm is detected inside the local network or a detection notification indicative of the detection of a worm in a remote network is received, the communication is shut off in accordance with the quarantine policy, thus making it possible to prevent the spread of worm infection as well as to prevent the local network from being infected with the worm.

The processes performed in the individual steps will be now described in detail.

First, a packet distribution process performed by the communication information acquisition unit 120 will be explained.

Figure 9:
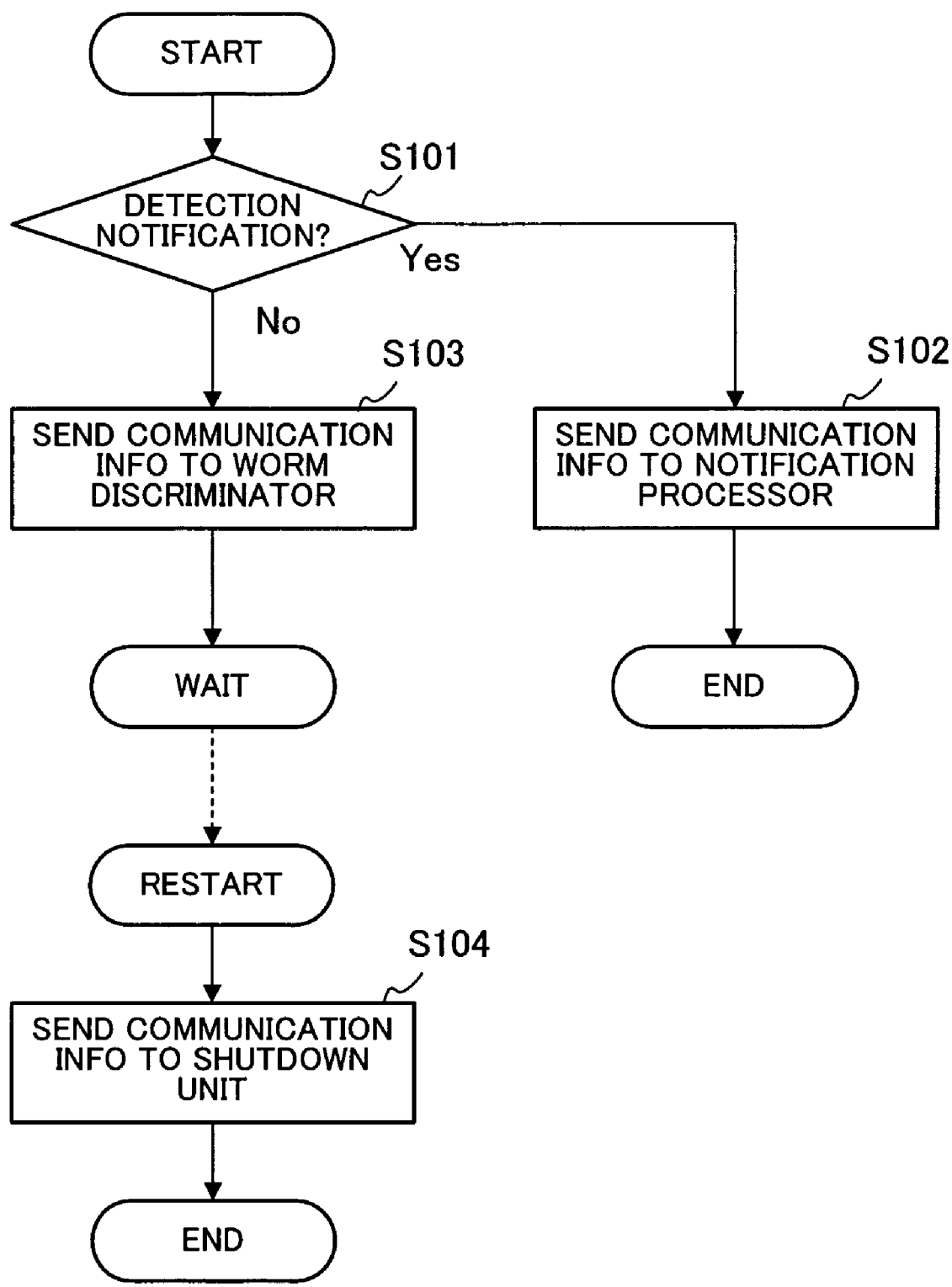
FIG. 9 is a flowchart illustrating a communication information acquisition process according to the embodiment.

FIG. 9 is a flowchart showing the communication information acquisition process according to the embodiment.

This process is started when the communication information acquisition unit 120 acquires a packet from the communication transmitter/receiver 110.

STEP S101: The communication information acquisition unit 120 determines whether or not the received packet is a detection notification from a remote worm detection/quarantine device. If the packet is not a detection notification, the process proceeds to Step S103.

STEP S102: Since the received packet is a detection notification notifying a worm detected in a remote network, the packet is sent to the detection notification processor 140, whereupon the process ends.

STEP S103: In the case where the received packet is not a detection notification from a remote network and should be checked for worms, that is, where the received packet is a packet transmitted to a device in the network segments under management or is a packet transmitted from a device in the managed network segments, communication information of the packet is transferred to the worm discriminator 130. The communication information is information necessary for the worm detection and may be a part or whole of the received packet. For example, where the header section alone is to be checked for worms, only the header section is extracted and the thus-extracted communication information is sent to the worm discriminator 130. Then, the process makes a transition to a wait state and remains in the wait state until the process of the worm discriminator 130 ends and restart of the process is requested.

STEP S104: Since the worm discrimination process of the worm discriminator 130 has been completed and the process is restarted, the communication information acquisition unit 120 transfers the communication information temporarily stored therein to the communication shutdown unit 170, whereupon the process ends.

As the aforementioned process is executed, the communication information acquisition unit 120 passes the packet received from the communication transmitter/receiver 110 on to the detection notification processor 140 if the packet is a detection notification from a remote worm detection/quarantine device, and passes the packet on to the worm discriminator 130 if the packet is not such a detection notification. If the packet is not a detection notification, it needs to be forwarded to the destination specified therein, and therefore, after the process of the worm discriminator 130 ends, the packet is sent to the communication shutdown unit 170. The shutdown unit 170 transmits the packet to its destination unless the packet matches the shutdown data.

The detection notification process performed by the detection notification processor 140 will be now described.

Figure 10:
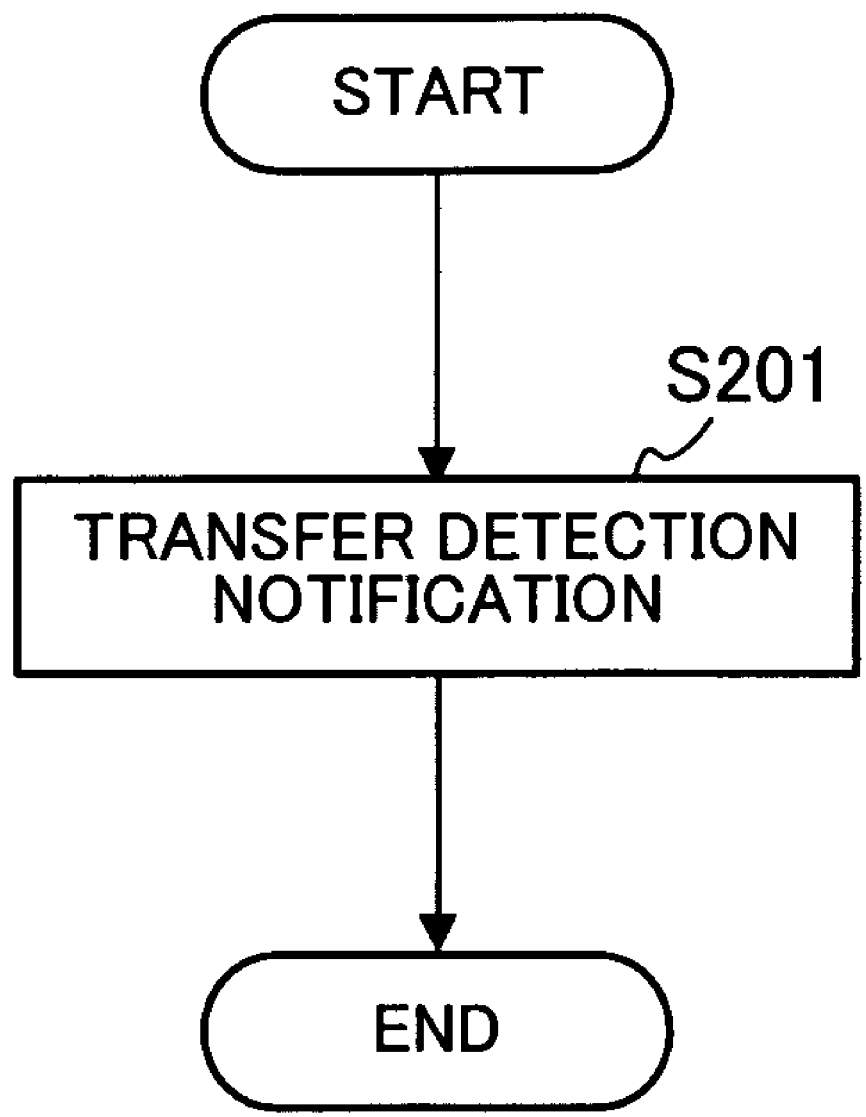
FIG. 10 is a flowchart illustrating a detection notification process according to the embodiment.

FIG. 10 is a flowchart illustrating the detection notification process according to the embodiment.

This process is started when a detection notification is input from the communication information acquisition unit 120.

STEP S201: The detection notification processor 140 transfers the acquired detection notification to the detection/quarantine manager 150, whereupon the process ends.

Consequently, the detection notification created by a remote worm detection/quarantine device is sent to the detection/quarantine manager 150.

The following describes the worm discrimination process performed by the worm discriminator 130 as well as the detection notification.

Figure 11:
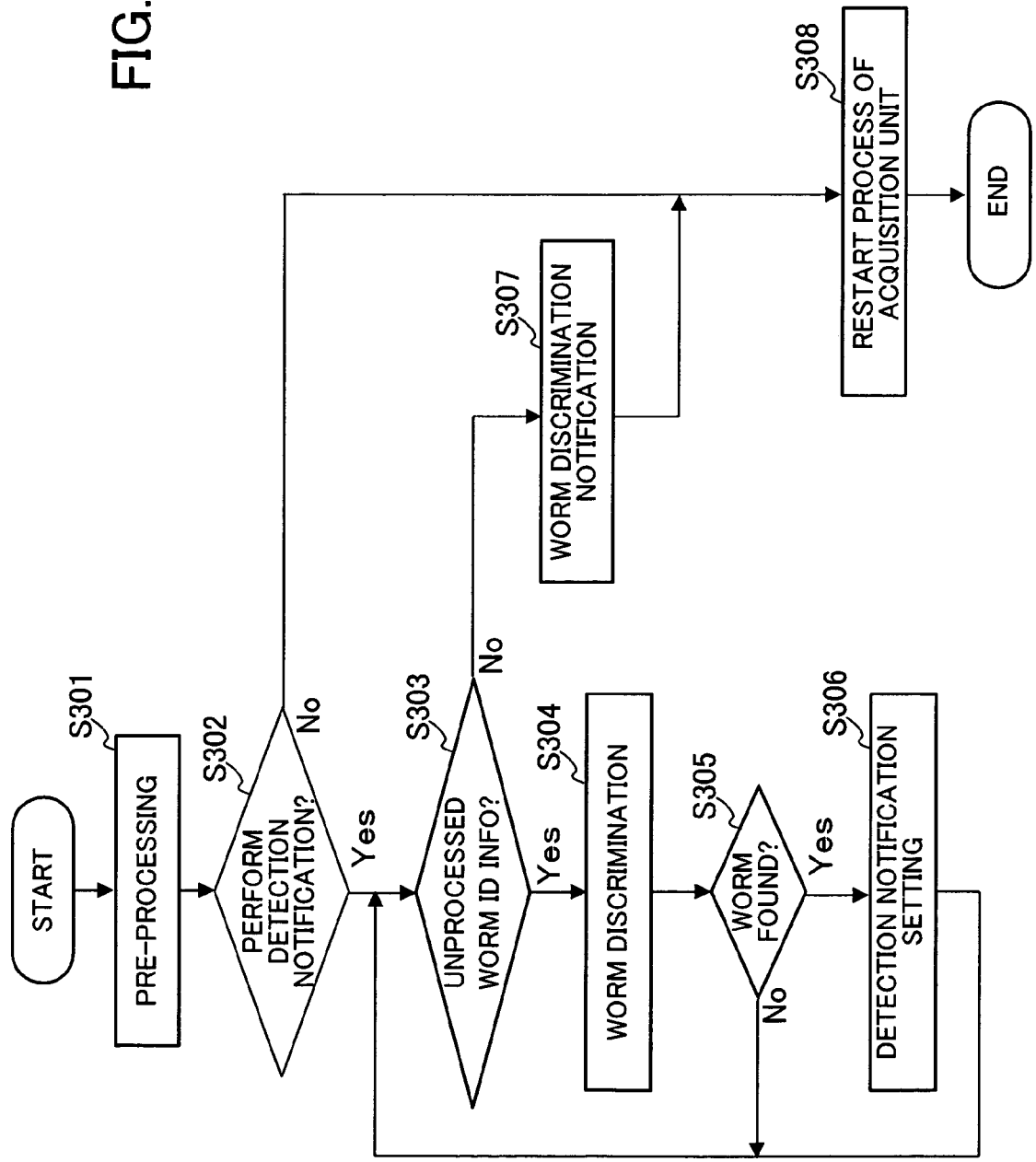
FIG. 11 is a flowchart illustrating a worm discrimination process according to the embodiment.

FIG. 11 is a flowchart illustrating the worm discrimination process according to the embodiment.

After it is ascertained by the communication information acquisition unit 120 that the received packet is an ordinary packet and not a detection notification, the worm discriminator 130 is input with part of the packet extracted as the communication information.

STEP S301: As pre-processing for the worm discrimination, the worm discriminator 130 checks the input communication information to prepare sample data for the worm discrimination. Worms may be discriminated on the basis of a single piece of communication information or a combination of multiple pieces of communication information. In this step, information necessary for the worm discrimination is prepared.

STEP S302: It is determined whether or not detection notification is to be performed, that is, whether or not all necessary information for the worm discrimination has been collected. If the worm discrimination cannot be performed because of a deficiency of sample data, for example, the process proceeds to Step S308.

STEP S303: It is determined whether or not there is worm identification (ID) information in unprocessed communication information. The worm identification information includes worm names identifying worms, service ports used by worms, etc. Specifically, the communication information collected in the pre-processing step S301 is checked to determine whether or not worm identification information is included in unprocessed communication information. If there is no unprocessed worm identification information, that is, if the worm discrimination process is to be ended, the process proceeds to Step S307.

STEP S304: There is unprocessed worm identification information, and in this case, the worm discrimination is performed with respect to one optional piece of the worm identification information. Thus, the worm identification information is checked for worms on a piece-by-piece basis.

STEP S305: The result of the worm discrimination (Step S304) is checked to determine whether or not a worm has been detected. If it is judged that no worm has been detected, the process returns to Step S303 to process the next piece of worm identification information.

STEP S306: It is judged that a worm has been detected, and in this case, the worm identification information, information on the worm detection/quarantine device and the worm destination address are set in the detection notification. The worm detection/quarantine device is specified by the identification number etc. previously assigned to the local device. The worm destination address is obtained by reading out the destination IP address 623 from the IP header section of the communication information. In the case of detecting worms based on multiple pieces of communication information, when a worm is detected, several packets have already been transmitted. In such cases, the destination addresses of the several packets transmitted until then are set as the worm destination addresses. After information with respect to one piece of worm identification information is set in the detection notification, the process returns to Step S303 to process the next piece of worm identification information.

STEP S307: Since information with respect to all pieces of worm identification information has been set in the detection notification, a worm discrimination notification is sent, together with the detection notification, to the detection/quarantine manager 150.

STEP S308: The process of the worm discriminator 130 has been completed, and accordingly, the process of the communication information acquisition unit 120 is restarted, whereupon this process ends.

As the aforementioned process is executed, a detection notification indicative of the detection or non-detection of a worm is generated.

In the case where the worm discriminator 130 is adapted to specify a worm that has ceased to be detected, the detection notification about a currently detected worm, generated in the detection notification setting step (S306), is compared with the previous detection notification created in the previous process, to identify a worm that has ceased to be detected.

FIG. 12 exemplifies the detection notification used in the embodiment.

In the detection notification 700 are set time information 701 indicative of the time of detection, identification information 702 indicating whether the detection type is the detection or non-detection of a worm, worm identification information 703, worm detection/quarantine device information 704, and a worm destination address 705. For the worm detection/quarantine device information 704 is set the identification information of the worm detection/quarantine device whose worm discriminator 130 has detected a worm-originated packet within the local network. Also, for the worm destination address 705 is set the destination address of the worm-originated packet.

In the illustrated example, a worm identified as "TCP 80" and having the destination address "Network 20" was detected ("Detection") at the time "15:00:00" by the "Worm Detection/Quarantine Device 100". Further, the worm ceased to be detected ("Non-detection") at the time "15:10:00".

Following the same procedure as described above, the other worm detection/quarantine devices create detection notifications, and accordingly, the detection notifications received from the other detection/quarantine devices have the same format.

Figure 13:
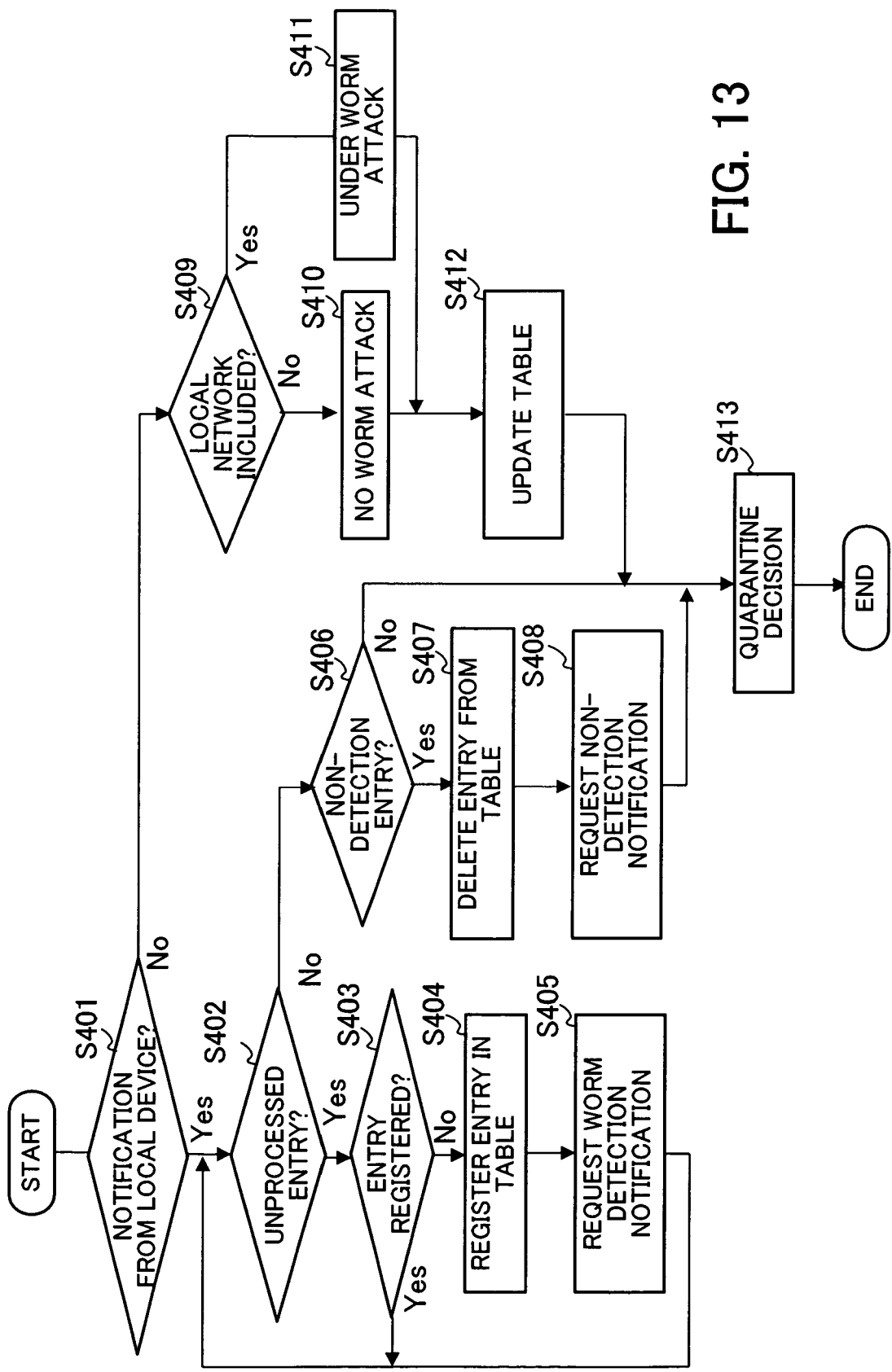
FIG. 13 is a flowchart illustrating a detection/quarantine process according to the embodiment.

The following describes the detection/quarantine process performed by the detection/quarantine manager 150 as well as the detection/quarantine status management table. FIG. 13 is a flowchart illustrating the detection/quarantine process according to the embodiment.

In the following description of the process, it is assumed that the worm discriminator 130 creates a detection notification only when "a communication suspected to have been originated by a worm is detected". The process is started when a detection notification is input from the worm discriminator 130 or the detection notification processor 140.

STEP S401: It is determined whether the input detection notification is a notification created by the worm discriminator 130 of the local device or transmitted from a remote device. To make the determination, the worm detection/quarantine device information 704 in the detection notification is looked up, and if the set identification information corresponds to the local device, it is judged that the notification is concerned with a worm detected within the local network, whereupon the process proceeds to Step S402. If the set identification information disagrees with that of the local device, it is judged that the detection notification has been transmitted from a remote device, and the process proceeds to Step S409.

<Case: Detection Notification has been Created by Local Device>

STEP S402: The worm identification information set in the detection notification is processed one by one until all of the set worm identification information is processed. In the detection notification, an entry is registered with respect to each piece of worm identification information, and therefore, it is determined whether or not there is an unprocessed entry. If there is no unprocessed entry, the process proceeds to Step S406.

STEP S403: Since there is an unprocessed entry in the detection notification, the entry is read out and is collated with the detection/quarantine status management table to determine whether or not the table includes an entry identical in content. If such an entry exists, it is judged that the communication shutdown process is already under execution; therefore, the process returns to Step S402 to process the next piece of worm identification information.

STEP S404: Based on the detection notification, the entry is added to the detection/quarantine status management table. The detection/quarantine status management table includes, as described later, information about "Time", "Worm Identification Information" and "Worm Detection/Quarantine Device" extracted from the detection notification, as well as "Worm Attack" indicating whether or not the local network is under worm attack. For "Worm Attack", "Yes" is set if the destination address of the worm-originated packet specifies the local network, and "No" is set if the local network is not specified. In this instance, it is assumed that an entry with "No" set as "Worm Attack" in accordance with the detection notification is created and added to the detection/quarantine status management table.

STEP S405: The detection notification transmitter 160 is requested to transmit the detection notification to the other worm detection/quarantine devices. The process then returns to Step S402 to process the next piece of worm identification information.

As the aforementioned steps are executed, the local device sets the detection/quarantine status management table for controlling shutdown of the local network in accordance with a worm detected inside the local network. After the addition of entries to the detection/quarantine status management table is completed, the following steps are executed.

STEP S406: The detection/quarantine status management table newly created in Step S404 is compared with a detection/quarantine status management table created during the previous process or created a predetermined period before, to determine whether or not there is worm identification information that has ceased to be detected. If such a non-detection entry does not exist, that is, if there is no worm identification information that has ceased to be detected, the process proceeds to Step S413.

STEP S407: The entry which is listed in the previous detection/quarantine status management table but not registered in the current detection/quarantine status management table is deleted from the detection/quarantine status management table. At this time, the deleted entry is temporarily kept in order to request cancellation of the shutdown.

STEP S408: The detection notification transmitter 160 is requested to transmit a non-detection notification to the other worm detection/quarantine devices. The process then proceeds to Step S413.

As the aforementioned steps are executed, the management information about worm-originated communication that has ceased to be detected is deleted, and a non-detection notification is transmitted to the other worm detection/quarantine devices.

<Case: Detection Notification has been Acquired from Remote Device>

STEP S409: The detection notification is analyzed to determine whether or not the local network is included as the worm destination address. If the local network is included as the worm destination address, the process proceeds to Step S411.

STEP S410: Since the local network is not included as the worm destination address, it is judged that the local network is not under attack yet. Accordingly, "No" is set for "Worm Attack", whereupon the process proceeds to Step S412.

STEP S411: Since the local network is included as the worm destination address, it is highly possible that the local network is already under attack. Accordingly, "Yes" is set for "Worm Attack".

STEP S412: If the detection notification is a notification indicating the detection of a worm, an entry is generated by affixing "Yes" or "No", set with respect to "Worm Attack" in Step S410 or S411, to "Time", "Worm Identification Information" and "Worm Detection/Quarantine Device" of the detection notification, and is added to the detection/quarantine status management table. On the other hand, if the detection notification is a notification indicating that a worm has ceased to be detected, the corresponding entry is deleted from the detection/quarantine status management table. In this manner, the detection/quarantine status management table is updated.

As the aforementioned steps are executed, an entry is added or deleted in accordance with the detection notification, thereby updating the detection/quarantine status management table. Subsequently, a decision as to quarantine is made based on the detection/quarantine status management table.

<Quarantine Decision>

STEP S413: With respect to each entry in the detection/quarantine status management table, the quarantine policy is looked up to determine whether the IN-communication or both IN- and OUT-communications should be shut off, and a shutdown request is sent to the communication shutdown unit 170. Also, the entry which was deleted in Step S407 but is temporarily held is looked up to send a shutdown cancel request to the shutdown unit 170.

As the aforementioned process is performed, the detection/quarantine status management table is updated, and a shutdown request and a shutdown cancel request are generated in accordance with the detection/quarantine status management table and the quarantine policy.

FIG. 14 shows an exemplary detection/quarantine status management table used in the embodiment.

Entries are added to and deleted from the detection/quarantine status management table 1511 as the detection/quarantine manager 150, which is adapted to effect quarantine on detecting a worm, performs the process shown in FIG. 13.

Each entry in the detection/quarantine status management table is generated by affixing "Worm Attack" to the information on "Time", "Worm Identification Information" and "Worm Detection/Quarantine Device" extracted from the corresponding detection notification.

Assuming that, in the illustrated example, the worm detection/quarantine device 100 is the local device, an entry 1511a has been set with respect to a worm detected by the worm discriminator 130. Entries 1511b, 1511c and 1511d have been set on the basis of detection notifications transmitted from worm detection/quarantine devices 200, 400 and 300, respectively.

The manner of how a quarantine decision is made based on the detection/quarantine status management table 1511 will be now explained. Let it be assumed that the following conditions are set as the quarantine policy.

(1) Shut off the IN- and OUT-communications if a worm is detected inside the local network.

(2) Shut off the IN- and OUT-communications if a worm is detected in a remote network and also if the local network is under attack.

(3) Shut off the IN-communication if a worm is detected in a remote network but the local network is not under attack.

With respect to the entry 1151a, a quarantine decision is made in the following manner. The worm has been detected in the local network (worm detection/quarantine device 100), and accordingly, a decision is made in accordance with the quarantine policy (1) that both of the IN- and OUT-communication services, which are suspected to be infected with the worm, should be shut off.

For the entry 1151b, the worm has been detected in a remote network (worm detection/quarantine device 200), but since the local network is under attack (Worm Attack=Yes), a decision is made in accordance with the quarantine policy (2) that both of the IN- and OUT-communication services, which are suspected to be infected with the worm, should be shut off. This decision is made because, although the worm is not detected in the local network yet, the local network is under attack and thus there may possibly be a terminal which has already been infected with the worm and will later act as an attacker.

Similarly, with respect to the entry 1151c, the worm has been detected in a remote network (worm detection/quarantine device 400), but since the local network is under attack (Worm Attack=Yes), a decision is made in accordance with the quarantine policy (2) that both of the IN- and OUT-communication services, which are suspected to be infected with the worm, should be shut off.

For the entry 1151d, the worm has been detected in a remote network (worm detection/quarantine device 300). However, since the local network is not under attack (Worm Attack=No), a decision is made in accordance with the quarantine policy (3) that the IN-communication service, which is suspected to be infected with the worm, should be shut off. Since the local network is not under attack, there is little possibility that the local network is infected with the worm. To eliminate the possibility that the local network will be attacked afterward, however, measures are taken to shut off the incoming communication and thereby prevent infection.

In the above, simple quarantine policy is explained, and in cases where it is unnecessary to use complicated quarantine policy, the procedure of the quarantine process may be described in program.

Also, if necessary, the quarantine policy may be set taking account of various situations, as shown in FIG. 5.

Further, in the above description, the quarantine process is executed as soon as a detection notification is received from a remote worm detection/quarantine device. Alternatively, a condition for starting the quarantine process may be set so that the quarantine process may be executed when the condition is fulfilled.

FIG. 15 illustrates an exemplary quarantine policy setting conditions for starting the quarantine process according to the embodiment.

The illustrated quarantine policy 1522 prescribes that the shutdown process should be executed if a detection notification of worm-originated communication including an identical destination port number and an identical protocol is received a plurality of times equal to or higher than a threshold. In the illustrated example, it is stipulated that the IN-communication be shut off if the detection notification of worm-originated communication including the settings "Destination Port No.=80" and "Protocol=TCP" is received twice, and that the OUT-communication be also shut off if the detection notification is received three times. Accordingly, when a detection notification identical in content is received for the first time, the quarantine process is not started and thus the communication is not shut off.

In this manner, the quarantine process is executed only when the count of worm detection notifications reaches the threshold, and this makes it possible to lessen the possibility that erroneous detection of worms exerts an influence upon remote networks cooperating with the local network.

The quarantine policy 1522 shown in FIG. 15 and the quarantine policy 1521 shown in FIG. 5 can be set at the same time.

The detection notification transmission process performed by the detection notification transmitter 160 will be now described.

Figure 16:
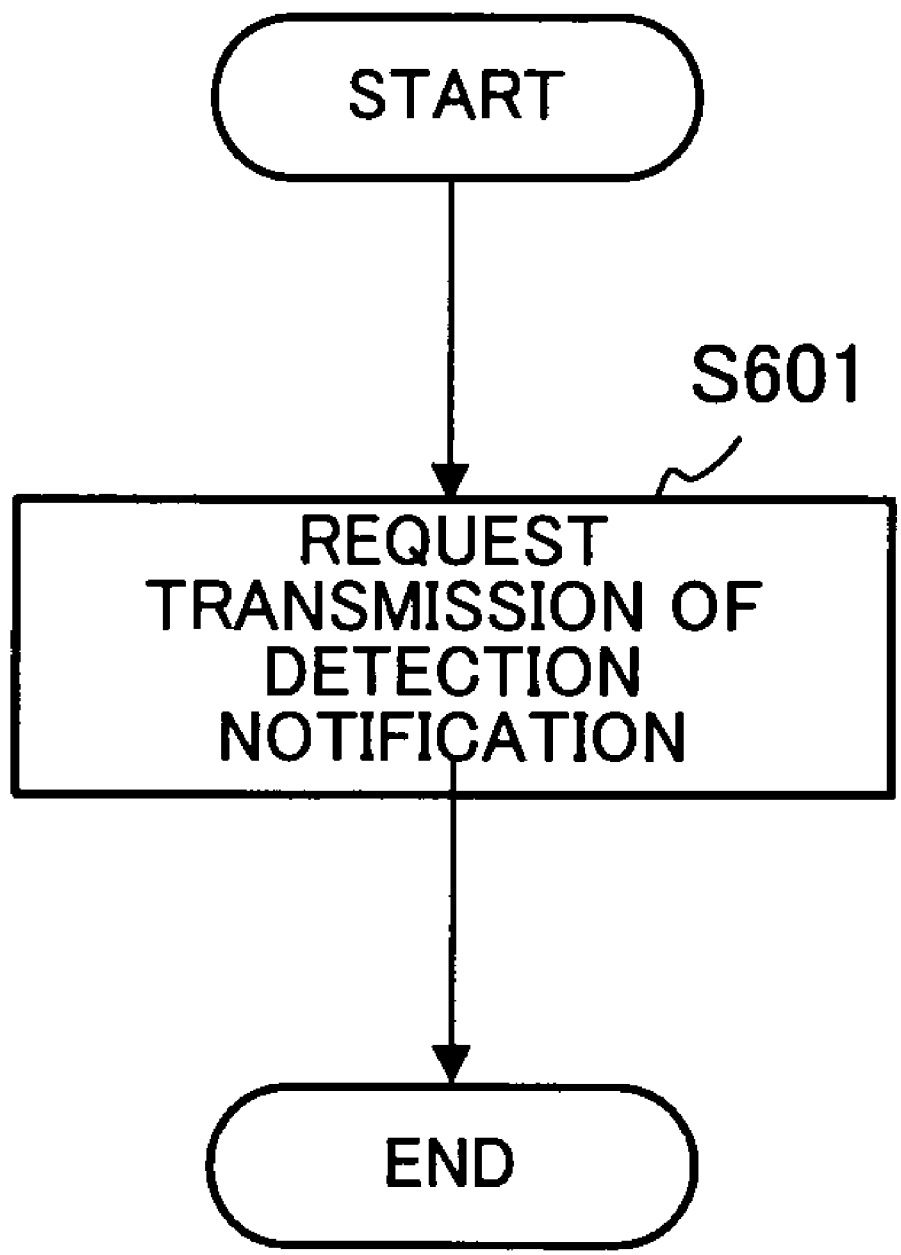
FIG. 16 is a flowchart illustrating a detection notification transmission process according to the embodiment.

FIG. 16 is a flowchart illustrating the detection notification transmission process according to the embodiment.

This process is started when a request to transmit a detection notification is received from the detection/quarantine manager 150.

STEP S601: The detection notification transmitter 160 requests the communication transmitter/receiver 110 to transmit the detection notification which has been requested by the detection/quarantine manager 150 and which notifies the worm detected by the worm discriminator 130 of the local device.

Consequently, the detection notification about the worm detected by the worm detection/quarantine device is transmitted to the other worm detection/quarantine devices collaborating with the local device.

The communication shutdown process performed by the communication shutdown unit 170 will be now described.

Figure 17:
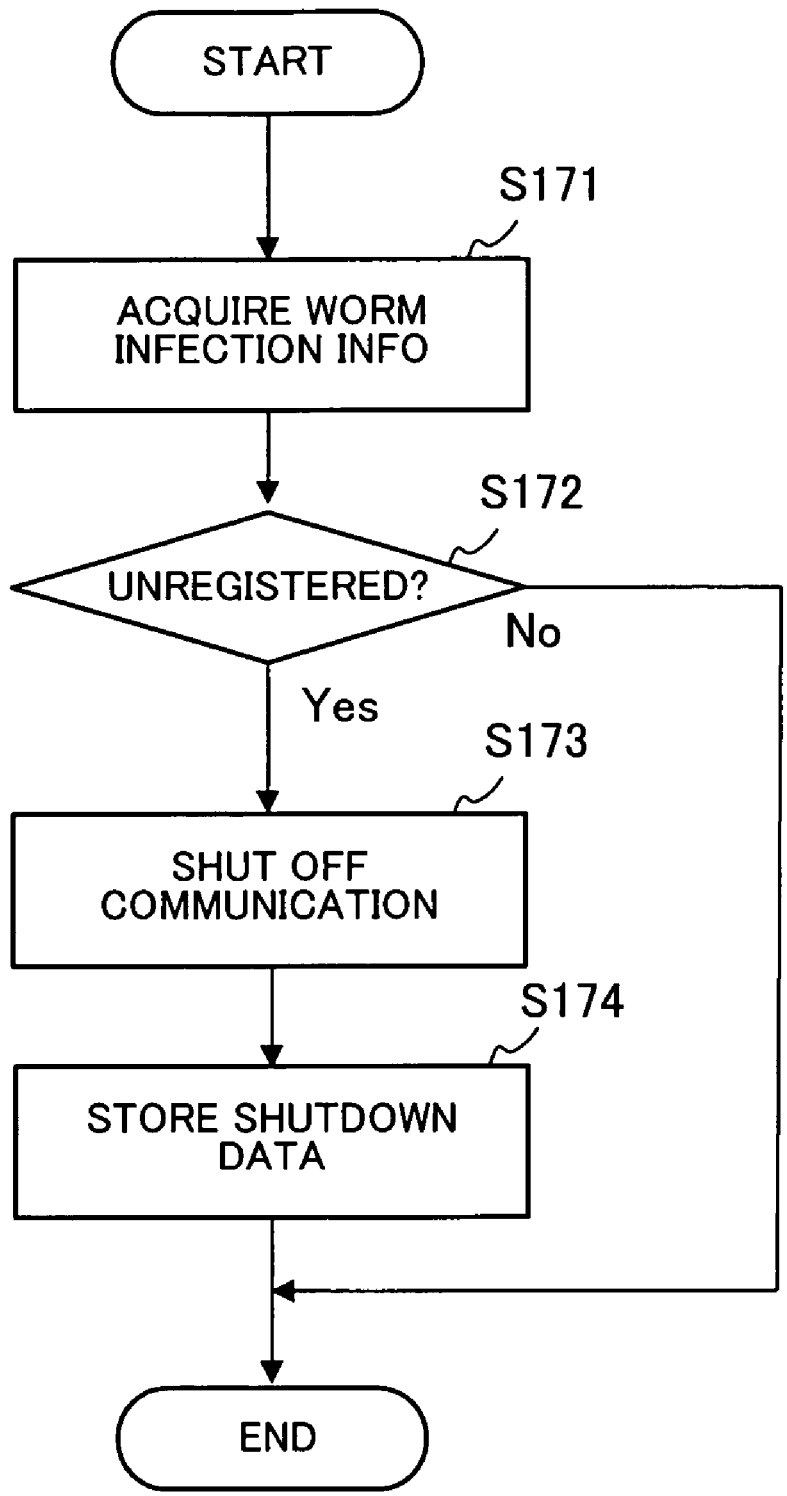
FIG. 17 is a flowchart illustrating a procedure for setting shutdown data during a communication shutdown process according to the embodiment.

FIG. 17 is a flowchart illustrating a procedure for setting shutdown data during the communication shutdown process according to the embodiment.

The process is started when a shutdown request or a shutdown cancel request is acquired from the detection/quarantine manager 150.

STEP S171: Based on the shutdown request or the shutdown cancel request, related worm infection information is acquired. In the case where shutdown is to be executed in response to a detection notification from a remote device, the worm identification information etc. is extracted from the detection notification as the worm infection information. Where a worm has been detected by the worm discriminator 130 of the local device, more detailed information can be obtained by looking up the communication information acquired by the communication information acquisition unit 120, besides the detection notification. Based on the worm infection information obtained in this manner, shutdown data identifying a communication service to be shut down is derived.

STEP S172: The shutdown data obtained in Step S171 is successively collated with the shutdown data registered in the shutdown data table stored in the shutdown data (storage device) 171, to determine whether or not the derived shutdown data is unregistered data not registered in the shutdown data table. If the shutdown data is registered, the necessary operation is already performed, and therefore, the process ends.

STEP S173: The shutdown data is not registered in the shutdown data table, and in this case, the corresponding worm-originated communication is shut off. In the case where the worm has been detected by the local device, the packet acquired from the communication information acquisition unit 120 is suspected to be infected with the worm and thus is discarded. In the case of the shutdown cancel request, no special operation is performed in this step.

STEP S174: If the received request is a shutdown request, the shutdown data is registered in the shutdown data table, and if the received request is a shutdown cancel request, the corresponding shutdown data is deleted from the shutdown data table. The shutdown data table which has thus been updated by the addition or deletion of data is stored in the shutdown data (storage device) 171.

As the above process is executed, the shutdown data table is updated in accordance with a shutdown request or a shutdown cancel request. The communication shutdown process executed based on the shutdown data table will be now described.

Figure 18:
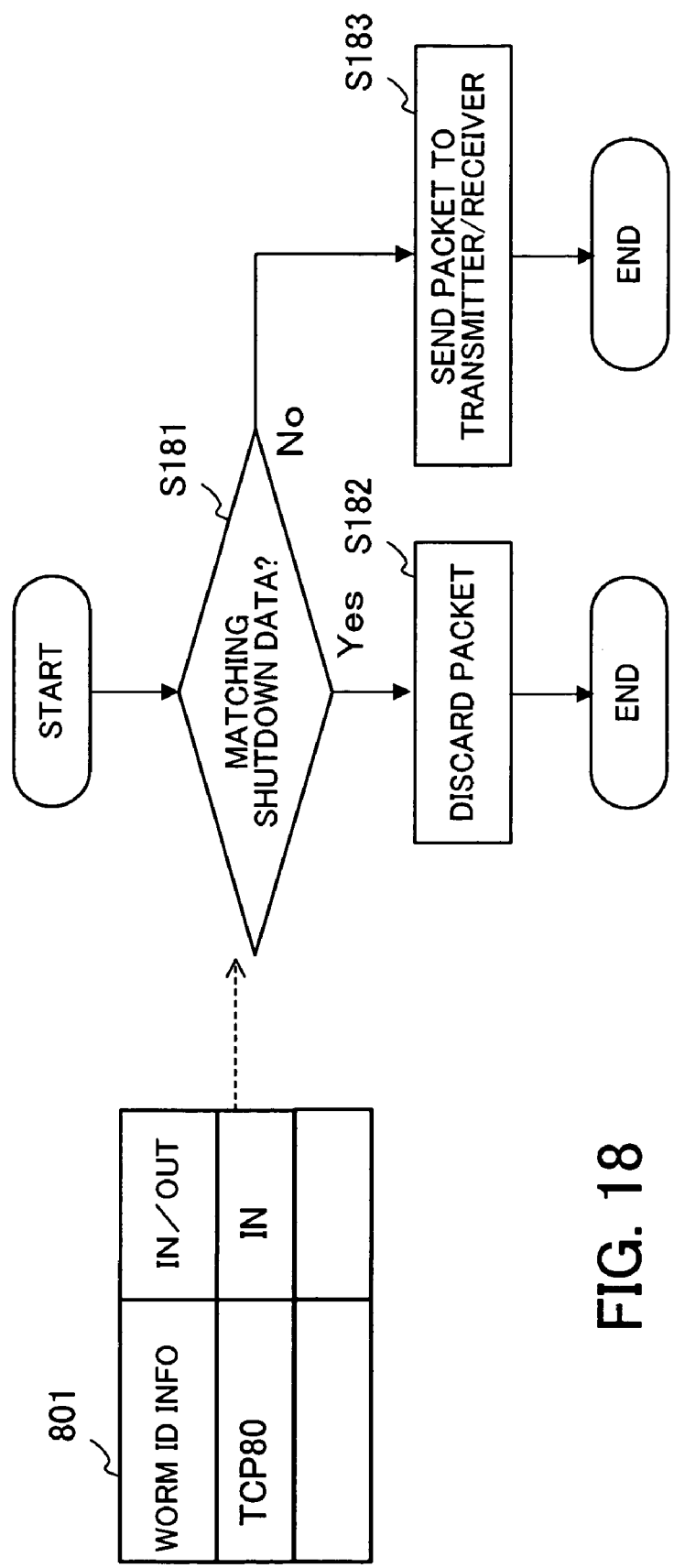
FIG. 18 is a flowchart illustrating a procedure for executing shutdown during the communication shutdown process according to the embodiment.

FIG. 18 is a flowchart illustrating a procedure for executing shutdown during the communication shutdown process according to the embodiment. In the illustrated example, the worm identification information and the direction of shutdown (IN or OUT) are set in a shutdown data table 801.

STEP S181: The packet acquired from the communication information acquisition unit 120 is collated with the shutdown data table 801, to determine whether or not the packet matches the shutdown data. In the illustrated example, the shutdown data table specifies that the IN-communication should be shut off if the worm type is "TCP80", and in this case, the destination and protocol of the acquired packet are looked up to determine whether or not the packet fulfills the condition. If the packet does not match the shutdown data, the process proceeds to Step S183.

STEP S182: Since the packet acquired from the communication information acquisition unit 120 matches the shutdown data, the packet is discarded, whereupon the process ends. Consequently, the packet fails to reach its destination.

STEP S183: The packet acquired from the communication information acquisition unit 120 does not match the shutdown data, and in this case, the packet is forwarded to the communication transmitter/receiver 110, whereupon the process ends. Accordingly, the packet is transmitted to its destination by the transmitter/receiver 110.

As the aforementioned process is executed, a communication service matching the shutdown data is shut down.

Thus, the worm detection/quarantine device of the embodiment shuts off the communication of the local network upon detecting a worm in the local network, and also notifies the other worm detection/quarantine devices connected thereto via a network that the worm has been detected, by means of a detection notification along with worm-related information such as the worm type and the target of attack (destination of communication). Upon receipt of the detection notification, the other worm detection/quarantine devices can take preventive measures in accordance with the detection notification and the preset quarantine policy, even if the worm is not yet detected in their local networks. In this manner, the worm detection/quarantine devices interconnected by a network can be made to collaborate with one another, and this makes it possible to quarantine a network segment infected with a worm and thereby prevent the spread of worm infection.

Figure 19:
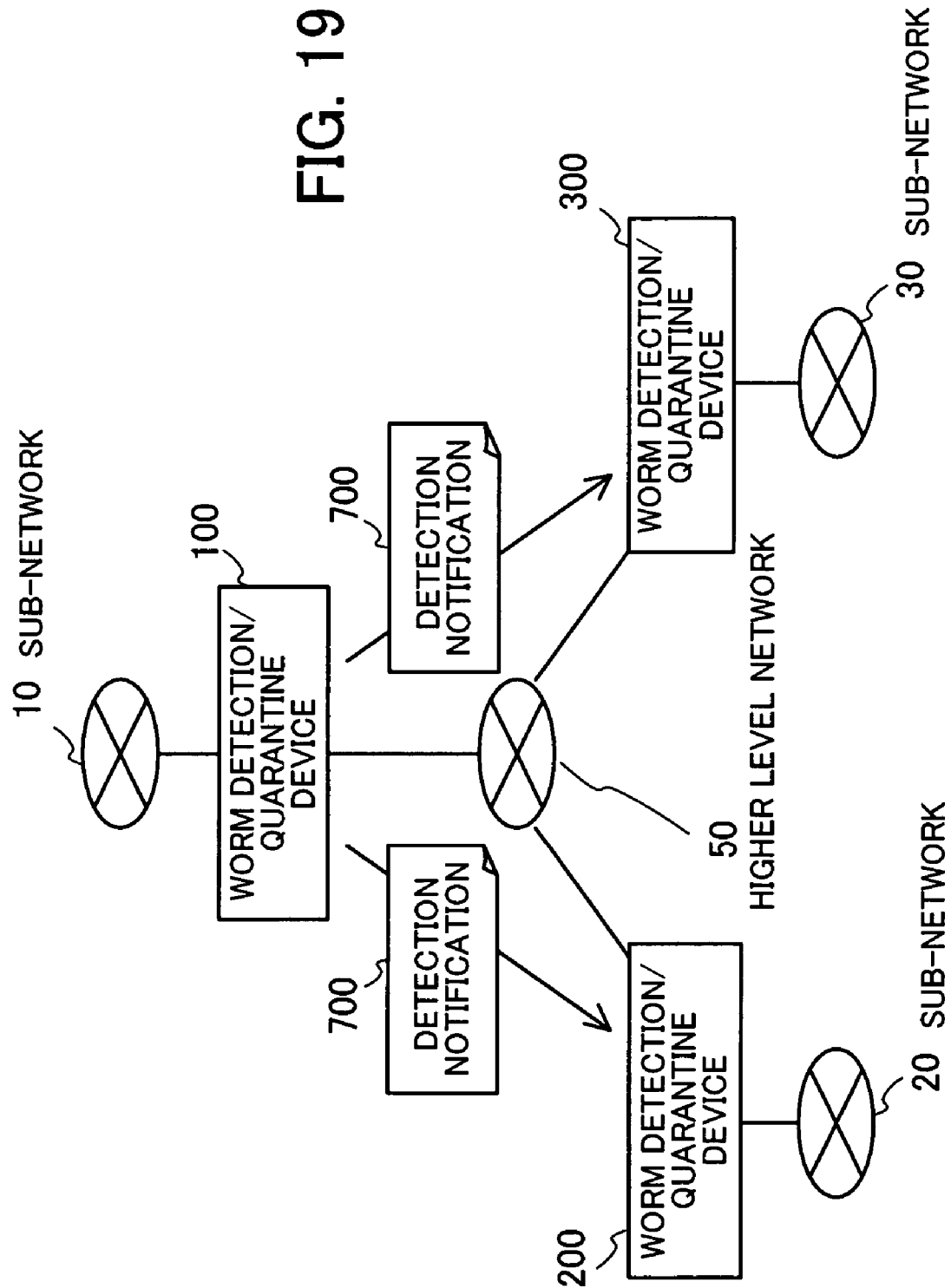
FIG. 19 illustrates a collaboration process of the worm detection/quarantine devices of the embodiment.

FIG. 19 illustrates such a collaboration process of the worm detection/quarantine devices of the embodiment.

The worm detection/quarantine devices 100, 200 and 300, which manage sub-networks 10, 20 and 30, respectively, are connected via the higher level network 50.

An exemplary quarantine policy set in each of the worm detection/quarantine devices of the embodiment will be explained with reference to FIG. 20.

According to the exemplary quarantine policy 1523 shown in the figure, while no worm is received by the local network ("Quarantine when worm is not targeting local network"), there is little possibility that computers in the local network are infected with a worm, and accordingly, the outgoing communication from the local network (OUT-communication) is not shut off. However, a worm has been detected in a remote network and there is a possibility that a worm-originated communication will enter the local network; therefore, the incoming communication to the local network (IN-communication), which may possibly be infected with the worm, is shut off. In the case where the local network has received a worm ("Quarantine when worm is targeting local network"), it is highly possible that the computers in the local network are infected with the worm. Accordingly, the IN- and OUT-communication services, which may possibly be infected with the worm, are both shut down. Also, the quarantine policy includes the setting that if the worm ceases to be detected by the local device, the quarantine should be discontinued regardless of the detection notification ("Continue quarantine when worm ceases to be detected by local device"="No"). Thus, if worm-originated communication is not detected in the local network over a waiting time of 20 seconds ("Waiting time for worm detection by local device") after the shutdown of the OUT-communication, it is judged that there is little possibility that the computers in the local network are infected with the worm, and the shutdown of the OUT-communication is canceled.

Referring again to FIG. 19, let us suppose that a computer infected with a worm is connected to the sub-network 10. If the infected computer starts to transmit the worm, the worm detection/quarantine device 100 detects the worm and shuts off the worm-originated communication, thereby shutting the worm into the sub-network 10. Then, the worm detection/quarantine device 100 transmits, to the other worm detection/quarantine devices 200 and 300, the detection notification 700 indicating that the worm has been detected.

Let it be assumed that, at this point of time, the worm detection/quarantine devices 200 and 300 have not yet detected the worm in their local networks. The detection notification 700 includes the destination of communication originated from the computer infected with the worm, and it is assumed here that the sub-network 20 is the destination of the worm-originated communication.

On acquiring the detection notification 700, the worm detection/quarantine device 200 judges that it is highly possible that the computers in the sub-network 20 are infected with the worm, because the worm has been received from the infected computer connected to the sub-network 10, though the worm has not yet been detected in the sub-network 20 under management. Thus, in accordance with the quarantine policy 1523, the worm detection/quarantine device 200 shuts off the IN- and OUT-communication services via which the worm may otherwise spread. By shutting off the IN-communication, it is possible to prevent the worm from invading into the sub-network 20 even in the case where the worm has spread to the other networks before the worm detection/quarantine device 100 shuts off the communication. Also, by shutting off the OUT-communication, it is possible to stop the worm from being transmitted in case the computers in the sub-network 20 are infected with the worm, thereby preventing the other networks from being infected with the worm. If the worm is not detected in the sub-network 20 over the waiting time (20 seconds), it is judged that there is little possibility that the computers in the sub-network 20 are infected with the worm, and therefore, the shutdown of the OUT-communication is canceled in accordance with the quarantine policy 1523. This ensures safety of the subsequent communication.

If the worm is detected thereafter from a computer connected to the sub-network 20, the worm detection/quarantine device 200 performs the same process as explained above in relation to the detection of the worm by the worm detection/quarantine device 100.

The worm detection/quarantine device 300 also receives the detection notification 700. Since the worm has not been received from the infected computer connected to the sub-network 10, there is little possibility that the computers in the sub-network 30 are infected with the worm. In this case, the IN-communication, which may possibly be infected with the worm, is shut off in accordance with the quarantine policy 1523, to prevent the invasion of the worm. It is also probable that a computer infected with worm is newly connected to the sub-network 30, and thus the setting "Quarantine when worm is not targeting local network" of the quarantine policy 1523 may be modified such that both IN- and OUT-communications are shut off. In this case, the IN- and OUT-communication services are shut down, as in the worm detection/quarantine device 200.

In this manner, the worm detection/quarantine devices cooperate with one another, and when a worm is detected by a worm detection/quarantine device, the other devices can take preventive measures to prevent infection, even if the worm is not yet detected in their local networks. Also, the notification from the worm detection/quarantine device which has detected the worm includes information about the detected worm, such as the worm type and the destination of worm-originated communication, and accordingly, the other worm detection/quarantine devices can take preventive measures best suited to their local networks, in accordance with the preset quarantine policy.

In the foregoing description, worms are detected by monitoring packets, but the present invention is not limited to such worm detection procedure alone. In connection with the worm detection, whether a worm is present in a local sub-network or not has only to be ascertained. For example, a worm detection program may be executed by a client or a server to check data, and when a worm is detected, the same process as described above may be executed. Further, the present invention may also be applied, as measures to ensure security of networks, to the protection against phenomena that can be effectively prevented by the shutdown of related networks, like worm attacks.

The processing function described above can be performed by a server computer of a client-server system. In this case, a server program is prepared in which is described the process for performing the function of the network shutdown device. In response to a request from a client computer, the server computer executes the server program, whereupon the aforementioned processing function is accomplished by the server computer and the processing result is provided to the client computer.

The server program describing the process may be recorded on server computer-readable recording media. As such server computer-readable recording media, magnetic recording devices, optical discs, magneto-optical recording media, semiconductor memories, etc. may be used. Magnetic recording devices include a hard disk drive (HDD), a flexible disk (FD), a magnetic tape, etc. Optical discs include a DVD (Digital Versatile Disc), a DVD-RAM, a CD-ROM (Compact Disc Read Only Memory), a CD-R (Recordable)/RW (Re-Writable), etc. Magneto-optical recording media include an MO (Magneto-Optical disk) etc.

To market the server program, portable recording media, such as DVDs and CD-ROMs, on which the server program is recorded may be put on sale.

A server computer which is to execute the server program stores in its storage device the server program recorded on a portable recording medium, for example. Then, the server computer loads the server program from its storage device and performs the process in accordance with the server program. The server computer may load the server program directly from the portable recording medium to perform the process in accordance with the server program.

According to the present invention, when a communication fulfilling the predetermined condition is detected in the network segment under management, the network shutdown device transmits a detection notification to other network shutdown devices connected thereto via a network, and also performs communication shutdown control. Also, the network shutdown device shuts off the communication in response to a detection notification from a remote network shutdown device, besides the detection by itself, to quarantine the managed network segment from the network. Thus, when a communication fulfilling the predetermined condition is detected in the managed network segment, the local device quarantines itself from the network, thereby preventing the communication from influencing the other network segments, and also when such a communication is detected by a remote device before it is detected by the local device, the local device shuts off the communication and thereby takes preventive measures to prevent the communication from influencing the managed network segment.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium recording a network shutdown control program for causing a computer to control shutdown of communication of at least one network segment belonging to a network having a plurality of network segments,
   wherein the network shutdown control program causes the computer to function as:
   detector means for monitoring the communication of a managed network segment to determine whether the communication fulfills a predetermined condition or not, generating predetermined detection notification information once it is judged that the communication of the managed network segment fulfills the predetermined condition, and sending the predetermined detection notification information to a network shutdown device managing another network segment belonging to the network;
   quarantine manager means operative in response to acquisition of the detection notification information from the detector means or acquisition of the detection notification information supplied from the network shutdown device and notifying that communication of the another network segment fulfills the predetermined condition, to generate a shutdown operation request relating to shutdown of incoming/outgoing communication of the managed network segment, based on the acquired detection notification information and in accordance with a quarantine policy stored in quarantine policy storage means, and to transmit the detection notification information acquired from the detector means to the network shutdown device; and
   communication shutdown means for acquiring the shutdown operation request from the quarantine manager means and, in accordance with the shutdown operation request, controlling shutdown of that communication of the managed network segment which fulfills the predetermined condition.

2. The recording medium according to claim 1, wherein the predetermined condition is set to discriminate a characteristic of communication originated by a worm so that the detector means can determine based on the predetermined condition whether or not the communication of the managed network segment is the worm-originated communication.

3. The recording medium according to claim 1, wherein the communication shutdown means sets shutdown data identifying a communication to be shut off, in accordance with the shutdown operation request, temporarily holds a packet output from the managed network segment and the packet to be input to the managed network segment to collate the packets with the shutdown data, discards the packets if the packets match the shutdown data, and allows the packets to pass if the packets do not match the shutdown data.

4. The recording medium according to claim 1, wherein the quarantine policy storage means stores, as the quarantine policy, the quarantine process to be performed with respect to each of the outgoing communication from the managed network segment to outside and the incoming communication from the outside to the managed network segment, and
   wherein, on acquiring the detection notification information, the quarantine manager means performs the quarantine process separately for the incoming communication and the outgoing communication in accordance with the quarantine policy stored in the quarantine policy storage means.

5. The recording medium according to claim 1, wherein the quarantine policy storage means stores, as the quarantine policy, information specifying whether or not the quarantine process is to be performed when communication fulfilling the predetermined condition is detected in the another network segment but not in the managed network segment, and
   wherein, when the detection notification information on the another network segment is acquired while communication fulfilling the predetermined condition is not detected by the detector means, the quarantine manager means determines based on the quarantine policy stored in the quarantine policy storage means whether to quarantine the managed network segment or not.

6. The recording medium according to claim 1, wherein, on detecting communication fulfilling the predetermined condition, the detector means detects a destination of a packet which is already transmitted at the time of the detection and which is concerned with the communication fulfilling the predetermined condition, and sets the detected destination in the detection notification information.

7. The recording medium according to claim 4, wherein the quarantine policy storage means stores, as the quarantine policy, the quarantine process to be performed when the communication fulfilling the predetermined condition and detected in the another network segment includes, as a destination, a device connected to the managed network segment and the quarantine process to be performed when the communication fulfilling the predetermined condition does not include, as the destination, a device connected to the managed network segment, and wherein, on acquiring the detection notification information on the another network segment, the quarantine manager means determines whether or not the destination set in the detection notification information includes the device connected to the managed network segment, and performs the quarantine process matching a determination result.

8. The recording medium according to claim 7, wherein the quarantine policy storage means stores, as the quarantine policy, information specifying that, when the destination includes the device connected to the managed network segment, the incoming and outgoing communications of the managed network segment should be shut off, and wherein, on acquiring the detection notification information on the another network segment, the quarantine manager means determines whether or not the destination set in the detection notification information includes a device connected to the managed network segment, and, if the destination includes the device of the managed network segment, generates a shutdown operation request to shut off the incoming and outgoing communications of the managed network segment as the communication fulfilling the predetermined condition, in accordance with the quarantine policy stored in the quarantine policy storage means.

9. The recording medium according to claim 7, wherein the quarantine policy storage means stores, as the quarantine policy, information specifying that, when the destination does not include the device connected to the managed network segment, the incoming and outgoing communications of the managed network segment should be shut off, and wherein, on acquiring the detection notification information on the another network segment, the quarantine manager means determines whether or not the destination set in the detection notification information includes the device connected to the managed network segment, and, if the destination does not include the device of the managed network segment, generates a shutdown operation request to shut off the incoming and outgoing communications of the managed network segment as the communication fulfilling the predetermined condition, in accordance with the quarantine policy stored in the quarantine policy storage means.

10. The recording medium according to claim 7, wherein the quarantine policy storage means stores, as the quarantine policy, information specifying that, when the destination does not include the device connected to the managed network segment, the incoming communication of the managed network segment should be shut off, and wherein, on acquiring the detection notification information on the another network segment, the quarantine manager means determines whether or not the destination set in the detection notification information includes the device connected to the managed network segment, and, if the destination does not include the device of the managed network segment, generates a shutdown operation request to shut off the incoming communication of the managed network segment as the communication fulfilling the predetermined condition, in accordance with the quarantine policy stored in the quarantine policy storage means.

11. The recording medium according to claim 1, wherein the quarantine policy storage means stores, as the quarantine policy, a waiting time for waiting for communication fulfilling the predetermined condition to be detected by the detector means after communication of the managed network segment is shut off on acquisition of the detection notification information on the another network segment, and wherein if, after a shutdown operation request to shut off the communication of the managed network segment is made based on the detection notification information from a different device, communication fulfilling the predetermined condition is not detected by the detector means over the waiting time, the quarantine manager means generates a shutdown operation request to cancel shutdown of the outgoing communication of the managed network segment, which has been shut off based on the detection notification information, in accordance with the quarantine policy stored in the quarantine policy storage means.

12. The recording medium according to claim 1, wherein the quarantine policy storage means stores, as the quarantine policy, a condition for executing the quarantine process in accordance with the detection notification information detected with respect to the another network segment, and wherein, on acquiring the detection notification information on the another network segment, the quarantine manager means determines whether or not the condition for executing the quarantine process is fulfilled or not, and executes the quarantine process if the condition is fulfilled.

13. The recording medium according to claim 12, wherein the condition for executing the quarantine process specifies the number of times the detection notification information is acquired.

14. The recording medium according to claim 1, wherein, if communication fulfilling the predetermined condition ceases to be detected by the detector means, the quarantine manager means generates non-detection notification information indicating that the communication fulfilling the predetermined condition has ceased to be detected, transmits the non-detection notification information to the network shutdown device, and, if quarantine of the managed network segment can be canceled according to the quarantine policy, generates a shutdown operation request to cancel shutdown of the communication of the managed network segment.

15. The recording medium according to claim 14, wherein, when the non-detection notification information is received from the network shutdown device and also if the detection notification information corresponding to the non-detection notification is not received from a different network shutdown device, the quarantine manager means generates a shutdown operation request to cancel shutdown of the communication which has been shut off in response to the detection notification information.

16. The recording medium according to claim 1, wherein, if the detection notification information has been generated by the detector means, the quarantine manager means generates the shutdown operation request to shut off that communication of the managed network segment which fulfills the predetermined condition, and if the detection notification information has been acquired from the network shutdown device, the quarantine manager means performs the quarantine process in accordance with the quarantine policy stored in the quarantine policy storage means.

17. A network shutdown device for controlling shutdown of communication of at least one network segment belonging to a network having a plurality of network segments, comprising:

detector means for monitoring the communication of a managed network segment to determine whether the communication fulfills a predetermined condition or not, generating predetermined detection notification information if it is judged that the communication fulfills the predetermined condition, and sending the predetermined detection notification information to a network shutdown device managing another network segment belonging to the network;

quarantine manager means operative in response to acquisition of the detection notification information from the detector means or acquisition of detection notification information supplied from the network shutdown device and notifying that communication of the another network segment fulfills the predetermined condition, to generate a shutdown operation request relating to shutdown of incoming/outgoing communication of the managed network segment, based on the acquired detection notification information and in accordance with a quarantine policy stored in quarantine policy storage means, and to transmit the detection notification information acquired from the detector means to the network shutdown device; and communication shutdown means for acquiring the shutdown operation request from the quarantine manager means and, in accordance with the shutdown operation request, controlling shutdown of that communication of the managed network segment which fulfills the predetermined condition.

18. A network shutdown method for controlling shutdown of communication of at least one network segment belonging to a network having a plurality of network segments, the method comprising:

monitor monitoring the communication of a managed network segment to determine whether the communication fulfills a predetermined condition;

generating predetermined detection notification information once it is judged that the communication fulfills the predetermined condition;

sending the predetermined detection notification information to a network shutdown device managing another network segment belonging to the network;

responsive to the generated detection notification information or acquisition of detection notification information supplied from the network shutdown device, notifying that communication of the another network segment fulfills the predetermined condition, generating a shutdown operation request relating to shutdown of incoming/outgoing communication of the managed network segment, based on the acquired detection notification information and in accordance with a stored quarantine policy transmitting the generated detection notification information to the network shutdown device;

acquiring the generated shutdown operation request;

controlling, in accordance with the shutdown operation request, shutdown of that communication of the managed network segment which fulfills the predetermined condition.

\* \* \* \* \*